(12) United States Patent
Hino

(10) Patent No.: US 7,386,790 B2
(45) Date of Patent: Jun. 10, 2008

(54) IMAGE PROCESSING APPARATUS, SERVER APPARATUS, IMAGE PROCESSING METHOD AND MEMORY MEDIUM

(75) Inventor: Yasuhiro Hino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 639 days.

(21) Appl. No.: 09/950,020

(22) Filed: Sep. 12, 2001

(65) Prior Publication Data

US 2002/0036788 A1    Mar. 28, 2002

(30) Foreign Application Priority Data

Sep. 12, 2000  (JP) ............................. 2000-275952
Sep. 12, 2000  (JP) ............................. 2000-277245

(51) Int. Cl.
*G06F 17/00* (2006.01)
(52) U.S. Cl. .................. 715/269; 715/234; 715/800; 715/815; 358/1.1; 358/1.2; 358/1.11
(58) Field of Classification Search ................ 715/542, 715/513, 234, 269, 800, 815; 358/1.1, 1.2, 358/1.11
See application file for complete search history.

(56) References Cited

U.S. PATENT DOCUMENTS

| | | | | |
|---|---|---|---|---|
| 5,491,760 | A * | 2/1996 | Withgott et al. ............. | 382/203 |
| 6,055,061 | A * | 4/2000 | Sato ........................... | 358/1.11 |
| 6,298,173 | B1 * | 10/2001 | Lopresti ...................... | 382/305 |
| 6,351,317 | B1 * | 2/2002 | Sasaki et al. ............... | 358/1.15 |
| 6,456,305 | B1 * | 9/2002 | Qureshi et al. ............. | 715/800 |
| 2001/0032218 | A1 * | 10/2001 | Huang ......................... | 707/513 |
| 2002/0060800 | A1 * | 5/2002 | Watanabe .................. | 358/1.11 |
| 2002/0149792 | A1 * | 10/2002 | Gauthier et al. ........... | 358/1.18 |
| 2002/0181001 | A1 * | 12/2002 | Klosterman et al. ....... | 358/1.11 |
| 2004/0141197 | A1 * | 7/2004 | Gauthier .................... | 358/1.11 |
| 2004/0179223 | A1 * | 9/2004 | Iwase et al. ............... | 358/1.13 |

FOREIGN PATENT DOCUMENTS

| | | |
|---|---|---|
| JP | 05-127848 | 5/1993 |
| JP | 07-184045 | 7/1995 |
| JP | 08-101881 | 4/1996 |
| JP | 09-282115 | 10/1997 |
| JP | 10-031666 | 2/1998 |
| JP | 10-114113 | 5/1998 |
| JP | 11-115257 | 4/1999 |

(Continued)

OTHER PUBLICATIONS

Witten, Ian and Bob Bramwell, "A System for Interactive Viewing of Structured Documents", Mar. 1985, Communications of the ACM, Computing Practices, vol. 28, No. 3.*

(Continued)

*Primary Examiner*—Rachna Singh
(74) *Attorney, Agent, or Firm*—Fitzpatrick, Cella, Harper & Scinto

(57) ABSTRACT

An image processing apparatus is disclosed which processes a document described in a structured description language to generate an image. The apparatus analyzes the document and recognizes the size of a font contained in the document. The user is allowed to enter a desired font size for output of the document. The apparatus then executes a drawing process with the entered font size.

25 Claims, 31 Drawing Sheets

FOREIGN PATENT DOCUMENTS

| | | |
|---|---|---|
| JP | 11-175295 | 7/1999 |
| JP | 11-249849 | 9/1999 |
| JP | 11-353147 | 12/1999 |
| JP | 2000-066867 | 3/2000 |
| JP | 2000-115527 | 4/2000 |
| JP | 2000-215017 | 8/2000 |

OTHER PUBLICATIONS

Van Den Brand, Mark and Eelco Visser, "Generation of Formatters for Context-Free Languages", ACM transactions on Software Engineering and Methodology, vol. 5, No. 1, Jan. 1996, pp. 1-41.*

Japanese Office Action, mailed Apr. 22, 2005, issued in counterpart application No. 2000-277245. Please note that all references listed in the Office Action had been cited in the IDS filed Aug. 11, 2006.

* cited by examiner

```
<order reference-print>
<document="http://myserver. com/mydocument" />
<papersize> A4 </paper>
<orientation> portrait </orientation>
<base-font-size> 8pt </base-font-size>
</order>
```

FIG. 6

```
<xml stylesheet="\mystylesheet">
<doc>
  <title> Sample </title>
  <para>
  This document is written in Markup
  Language, logical data structure and lo
  gical layout.
  </para>
  <table> </table>
  <tfooter> table 1 </tfooter>
<doc>
```

FIG. 7

```
<stylesheet>
<template pattern="title">
<font size=big fontcolor=red position=center>
<template>

<template pattern="para">
<fontsize=small fontcolor=black>
<pat=mesh patcolor=blue>
</template>

<template pattern="table">
<table width=4height=3>
</template>

<template pattern="tfooter">
<font size=middle position=center>
</template>
</stylesheet>
```

FIG. 8

```
<document>
<unit size=mm/>
<text size=24po color=red x=100 y=0>
Sample </text>
<fill pat="0xaa aa" color=blue> </fill>
<rect 10 200 1000 300/>
<text size=10po color=black x=0 y=30>
This document is written in </text>
<text x=20 y=30>
Markup Language, logical data </text>
<text x=40 y=30>
Structure and logical layout. </text>
<fill pat=null/>
<rect 40 50 200 100/>
<line 80 50 80 100/>
<line 120 50 80 100/>
<line 160 50 80 100/>
<line 200 50 80 100/>
<line 40 70 200 70/>
<line 40 90 200 90/>
</document>
```

```
<html>
<body bgcolor="#ffffff" >
<H1> Sample </H1>
<table border=" 0" width=" 100%" >
   <tr>
      <td width=" 60%" > <p align=" center" > Sample </td>
      <td width=" 20%" > <p align=" right" > Data </td>
</able>
<hr>
<p> <font size=" 4" > html document </font></p>
</body>
</html>
```

FIG. 21

MEMORY MAP OF MEM MEDIUM
(FD/CD-ROM)

| DIRECTORY |
|---|
| 1ST DATA PROCESSING PROGRAM<br>PROGRAM CODES FOR FLOWCHART OF FIG.9 |
| 2ND DATA PROCESSING PROGRAM<br>PROGRAM CODES FOR FLOWCHART OF FIG.10 |
| 3RD DATA PROCESSING PROGRAM<br>PROGRAM CODES FOR FLOWCHART OF FIG.11 |
| 4TH DATA PROCESSING PROGRAM<br>PROGRAM CODES FOR FLOWCHART OF FIG.12 |
| 5TH DATA PROCESSING PROGRAM<br>PROGRAM CODES FOR FLOWCHART OF FIG.13 |
| 6TH DATA PROCESSING PROGRAM<br>PROGRAM CODES FOR FLOWCHART OF FIG.17 |
| 7TH DATA PROCESSING PROGRAM<br>PROGRAM CODES FOR FLOWCHART OF FIG.20 |
|  |

FIG. 27

```
<html>
<body bgcolor="#ffffff">
<H1>Sample</H1>
This document is written in Markup Language. logical data
structure and logical layout.for web browser.
<table border="0" width="100%">
<tr>
   <td width="60%"><p align="center">.......</td>
   <td width="20%"><p align="right">.......</td>
</tr>
</table>
<hr>
<p><font size="4">table 1</font></p>
</body>
</html>
```

FIG. 28

Sample

This document is written in Markup Language. logical data structure and logical layout for web browser.

table 1

FIG. 29

```
<document>
<unit size="mm"/>
<text size="28pt" color="red" x="100" y="0">
Sample</text>
<fill pat="aa aa" color="blue"></fill>
<rect 10 200 200 500/>
<text size="12pt" color="black" x="0" y="1">
This document is written </text>
<text size="12pt" x="0" y="2">
in Markup Language. </text>
<text size="12pt" x="0" y="3">
logical data structure and </text>
<text size="12pt" x="0" y="4">
logical layout for web </text>
<text size="12pt" x="0" y="5">
browser. </text>
<fill pat="null"/>
<rect 40 50 120 80/>
<line 80 50 80 80/>
<line 40 60 120 60/>
<line 40 70 120 70/>
<rect 40 90 120 120/>
<line 80 90 80 120/>
<line 40 100 120 100/>
<line 40 110 120 110/>
<text size="8pt" x="3" y="10">
table 1 </text>
</document>
```

FIG. 30

```
<document>
<unit size="mm"/>
<text size="20pt" color="red" x="100" y="0">
Sample</text>
<fill pat="aa aa" color="blue"></fill>
<rect 30 200 200 500/>
<text size="8pt" color="black" x="0" y="1">
This document is written in </text>
<text size="8pt" x="0" y="2">
Markup Language. logical data</text>
<text size="8pt" x="0" y="3">
structure and logical layout for</text>
<text size="8pt" x="0" y="4">
web browser</text>
<fill pat="null"/>
<rect 30 50 230 110/>
<line 80 50 80 110/>
<line 130 50 130 110/>
<line 180 50 180 110/>
<line 30 70 230 70/>
<line 30 90 230 90/>
<text size="6pt" x="3" y="10">
table 1 </text>
</document>
```

FIG. 31

```
<document>
<unit size="mm"/>
<text size="23pt" color="red" x="100" y="0">
Sample</text>
<fill pat="aa aa" color="blue"></fill>
<rect 30 200 200 500/>
<text size="10pt" color="black" x="0" y="1">
This document is written in</text>
<text size="10pt" x="0" y="2">
Markup Language,logical</text>
<text size="10pt" x="0" y="3">
data structure and logical</text>
<text size="10pt" x="0" y="4">
layout for web browser</text>
<fill pat="null"/>
<rect 0 50 240 110/>
<line 60 50 60 110/>
<line 120 50 120 110/>
<line 180 50 180 110/>
<line 0 70 240 70/>
<line 0 90 240 90/>
<text size="7pt" x="3" y="10">
table 1 </text>
</document>
```

FIG. 32

Sample

This document is written in Markup Language. logical data structure and logical layout.for web browser.

table 1

FIG. 33

Sample

This document is written in Markup Language. logical data structure and logical layout for web browser.

table 1

⟨order reference-print⟩

⟨document="http://myserver.com/mydocument"/⟩

⟨papersize⟩ A4 ⟨/paper⟩

⟨orientation⟩ portrait ⟨/orientation⟩

⟨base-font-size⟩ 8pt ⟨/base-font-size⟩

⟨object-mag⟩ small ⟨/object-mag⟩

⟨/order⟩

IMAGE PROCESSING APPARATUS, SERVER APPARATUS, IMAGE PROCESSING METHOD AND MEMORY MEDIUM

BACKGROUND OF THE INVENTION

1. Field of the Invention

The present invention relates to an image processing apparatus for processing document data described in a predetermined structured description language utilizing such document data and externally entered print setting information, a server apparatus capable of communication with such image processing apparatus, an image processing method and a program therefor.

2. Related Background Art

Rapid popularization of the personal computers and the internet in recent years has accelerated the shift of documents to electronic ones in every fields. However, since the data format of the electronic document depends on the application used for editing the document information, it is required, in order to view the document information in the electronic form, to support an application supporting the data format of such document information. Also there are becoming popular the documents described in a structured description language not dependent on a specific application, such as HTML (Hyper Text Markup Language) or XML (extensible Markup Language).

The structured description language, represented by these languages, is designed primarily for display on a display image by an application in which the information viewing software or so-called browser or various HTML is supported, and lacks the concept of page. In case of display with the browser, the concept of page is unnecessary because it is possible to arbitrarily change the width or the height of the displayed image or to scroll the displayed image. On the other hand, in case of using the structured description language as a page description language, there is required page allotment, and the present invention is to meet such requirement.

A step of converting a structured description language without the concept of page into a structured description language capable of page layout is called formatting. However, if the formatting into a physical page in fixed manner with an absolute scale such as a font size, there may be encountered a drawback that the page becomes not well legible depending on its content or that the layout does not match the taste of the user. The physical page means an output page obtained by printing image data on paper. Also the physical page includes a page outputted on a display of a host computer or the like by previewing the print data. Also in printing the structured document, a method of designating the font size with a HTML editor or a web browser in a personal computer is associated with a drawback that the document has to be once received by the host equipment, then opened by the application and subjected to cumbersome operations on the application in order to achieve designation of the font.

In recent years, there are developed applications for editing the web browser and the HTML file, and it is made possible to designate the font size by the input means of a personal computer (PC) on the HTML document displayed by the application and executing page layout on the PC for transmission to a printer. However there remains a drawback that the base font size in the structured document can be set by the aforementioned font size designation but the font size of the characters designated individually by the author of the document cannot be changed. For example a technology of dividing a page into a table area and a text area and designating different font magnification rates respectively for these areas is incapable of obtaining a document with easily legible characters by unconditionally designating the font size at a specified size or larger.

Also there is known a technology in which, in executing page layout of a document, a program calculates the magnification rate of the font applied to a page separated into the table area and the text area according to a predetermined algorithm thereby achieving layout. More specifically, there is known a technology which, in a table area, reduces the black area on a condition that the character train contained in the entry of the table is not split into a new line, thereby enlarging the font so as to increase the print area. Also, in case the font of the text area is enlarged, there increases the proportion of the print area contained in a page. Therefore the font size of such text area is enlarged in such a manner that the print area becomes equal to or larger than a predetermined proportion. However, such enlargement of font depends on thestate of layout and the output is not necessarily executed in the font size designated by the user. For example, in case of print data with an originally large proportion of print area, such as a large table containing small characters, the program does not enlarge the font even if the characters are outputted with a small font size. Thus since too much emphasis is given to the proportion of the print area, there cannot be obtained the output with the font size desired by the user.

SUMMARY OF THE INVENTION

A first object of the present invention is to achieve appropriate formatting of the document utilizing information contained in the structured document and/or information relating to the physical page to which the structured document is to be allotted. Such object can be attained, according to a preferred embodiment of the present invention, by the following configuration of outputting character information, contained in the document information obtained from a server apparatus, in a desired font size, utilizing, in analyzing the document information described in a predetermined structured description language, a font size set or designated in advance or character size information most frequently appearing in the document or information on the smallest character size appearing in the document or information on the maximum object width appearing in the document or information consisting of a combination of the foregoing. This embodiment enables layout of the document information described in the predetermined structured description language, taking a desired font size designated by predetermined designation means as the standard font size for the character or character train of the structured document. Also there can be provided an image processing apparatus, an image processing method and a program therefor, capable of realizing page layout of a high freedom thereby selecting the output according to the taste of various generations from aged persons to children. Also according to a preferred embodiment of the present invention, designation/input means for the font size is provided on the image processing apparatus to achieve page layout by a simple input from an operation unit of the image processing apparatus or from a remote host computer to the image processing apparatus without operating the application such as the HTML editor on the PC.

A second object of the present invention is to provide an image processing apparatus, a server apparatus, an image processing method or a program therefor capable of image output of various document information subjected to page layout with the size desired by the user, without the server applying the drawing burden on the image processing apparatus. This object can be attained, according to a preferred embodiment, by a configuration in which a font size designated by the user in the reference print instruction as print setting information is transmitted to the server apparatus from which the document information is to be obtained, and the document information subjected to layout in the server apparatus according to such print setting information is obtained and outputted.

The objects of the present invention are not limited to those attained by the aforementioned embodiments, but the present invention may assume other configurations as long as there can be attained the object of obtaining a drawing output of satisfactory appearance in allotting the structured document to the physical page or obtaining a print output of satisfactory appearance by print instruction through a network. Other features and advantages of the present invention will become apparent from the following description taken in conjunction with the accompanying drawings, in which like reference characters desintate the same or similar parts throughoutthereof.

BRIEF DESCRIPTION OF THE DRAWINGS

FIG. 6 is a view showing an example of document data stored in the document server shown in FIG. 5;

FIG. 7 is a view showing an example of a style sheet stored in the document server shown in FIG. 5;

FIG. 8 is a view showing an example of the document data converted by the process of of a layout data generator shown in FIG. 5;

FIG. 21 is a view showing the memory map of a memory medium storing various data processing programs readable by a print system in which the image processing apparatus or the server apparatus of the present invention is applicable;

FIG. 27 is a view showing an example of document data described by HTML;

FIG. 28 is a view showing an example of print after formatting in the fourth embodiment;

FIG. 29 is a view showing an example of document data after formatting in the fourth embodiment;

FIG. 30 is a view showing an example of document data after formatting in the fifth embodiment;

FIG. 31 is a view showing an example of document data after formatting in the sixth embodiment;

FIG. 32 is a view showing an example of print after formatting in the fifth embodiment;

FIG. 33 is a view showing an example of print after formatting in the sixth embodiment;

DETAILED DESCRIPTION OF THE PREFERRED EMBODIMENTS

Now the present invention will be clarified in detail by preferred embodiments thereof, with reference to the accompanying drawings. At first there will be explained, with reference to FIG. 1, the configuration of a laser beam printer (LBP) suitable for application of the embodiments. However the embodiments are applicable not only to a laser beam printer but also any other printers capable of forming and outputting an image. For example, there can naturally be employed a copying machine, a facsimile apparatus or an ink jet printer. Also the output means in the present invention not only includes the print output by a printer but also previewing in a display unit of the printer. Also the image processing apparatus naturally includes not only a printer but also an image processing controller provided therein or a computer provided with a software capable of formatting process. In the following there will be explained embodiments of the present invention with reference to the accompanying drawings.

First Embodiment

Figure 1:
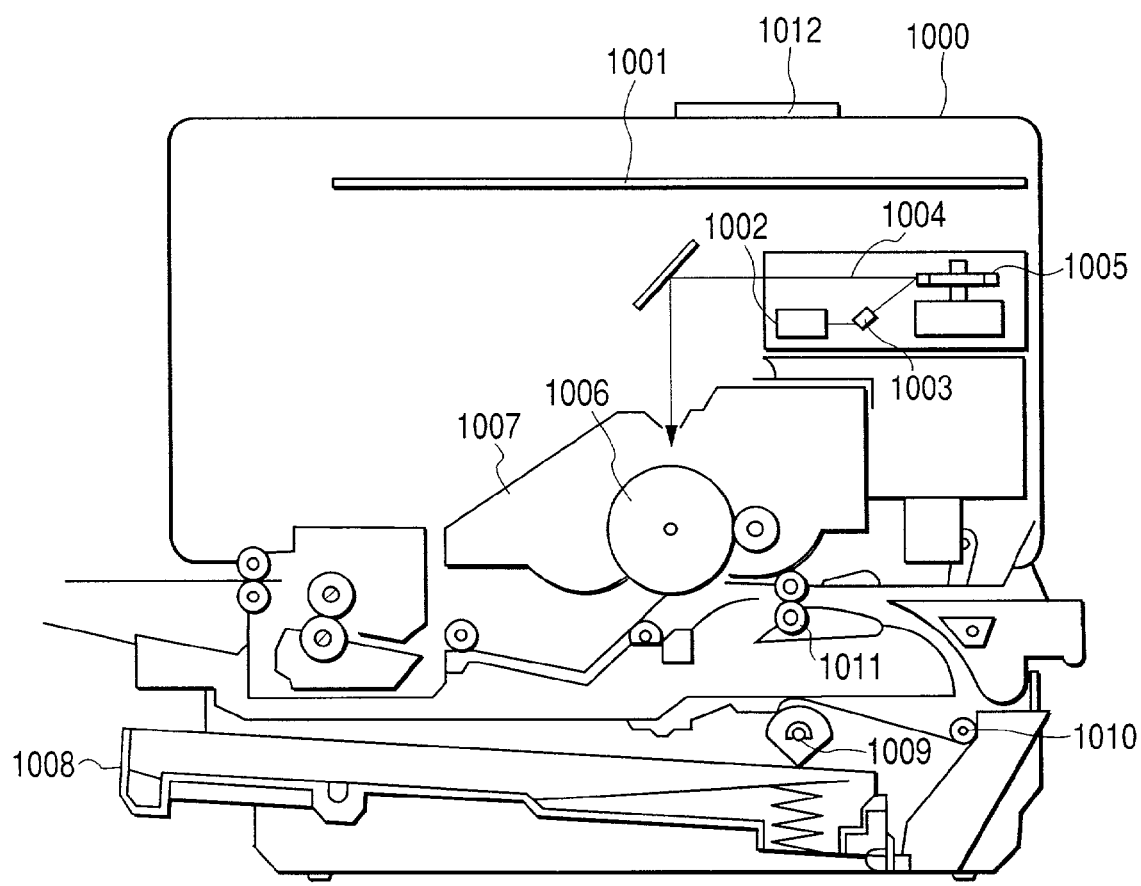
FIG. 1 is a cross-sectional view showing the internal structure of a laser beam printer applicable to embodiments of the present invention.

FIG. 1 is a cross-sectional view showing the internal structure of a laser beam printer which is applicable to the present embodiment and to which character patterns or a fixed format (format data) can be registered from an unrepresented data source.

Referring to FIG. 1, a main body of the laser beam printer (hereinafter simply called printer) receives and memorizes character information (character codes), form information, macro instructions etc. supplied from an externally connected host computer, prepares corresponding character patterns or form figures according to such information and forms an image on a recording sheet constituting a recording medium.

An operation panel 1012 is provided with switches for operation and an LED display unit, and is capable of entering for example print set information to be explained later. A printer control unit 1001 controls the entire printer 1000 and analyzes the character information supplied to a host computer. The printer control unit 1001 converts principally character information into a video signal of a corresponding character pattern for supply to a laser driver 1002 which serves to drive a semiconductor laser 1003. The laser driver 1002 executes on/off control of a laser light 1004 emitted from the semiconductor laser 1003 according to the entered video signal. The laser light 1004 is deflected laterally by a rotary polygon mirror 1005 for scanning an electrostatic drum 1006.

Thus there is formed an electrostatic latent image of the character pattern on the electrostatic drum 1006. The latent image is developed by a developing unit 1007 provided around the electrostatic drum 1006 and then is transferred onto a recording sheet, consisting of a cut sheet. The recording cut sheet is contained in a sheet cassette 1008 mounted on the printer 1000, then fetched into the apparatus by a sheet feeding roller 1009, and conveying rollers 1010, 1011 and supplied to the electrostatic drum 1006.

Figure 2:
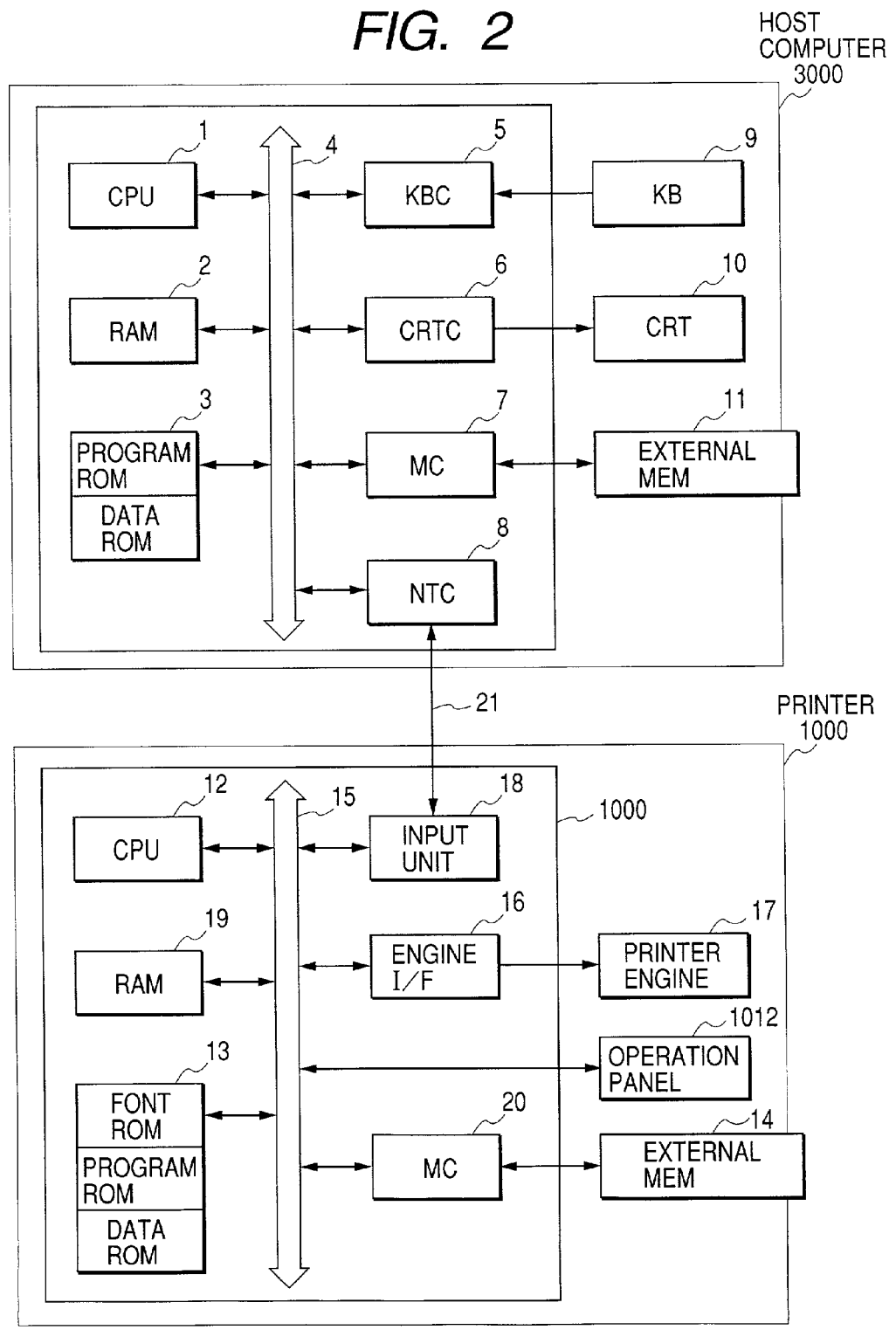
FIG. 2 is a block diagram showing the configuration of a printer control system constituting an embodiment of the present invention.

FIG. 2 is a block diagram showing the configuration of a printer control system embodying an embodiment of the present invention. The present embodiment will be explained by a laser beam printer (FIG. 1). However the present invention is naturally applicable to a single equipment, a system consisting of plural equipment or a system in which the process is executed through a network such as a LAN as long as the function of the present invention can be attained.

Referring to FIG. 2, a host computer 3000 has following functions. There is provided a CPU 1 for executing fetching of document data and data conversion according to a document processing program or the like stored in a program ROM of a ROM 3, and the CPU 1 collectively controls the devices connected to a system bus 4. The program ROM of the ROM 3 also stores the control program etc. of the CPU 1. A font ROM of the ROM 3 stores font data etc. to be used in the aforementioned data conversion process. A data ROM of the ROM 3 stores various data to be used in the aforementioned data conversion process.

A RAM 2 is used as a main memory and a work area for the CPU 1. A keyboard controller (KBC) 5 controls the input from a keyboard (KB) 9 and an unrepresented pointing device. A CRT controller (CRTC) 6 controls the display on a CRT display (CRT) 10. The CRT may also be used for previewing the result of layout process of the structured document to the physical page. The layout process of the structured document will be explained later.

Figure 42:
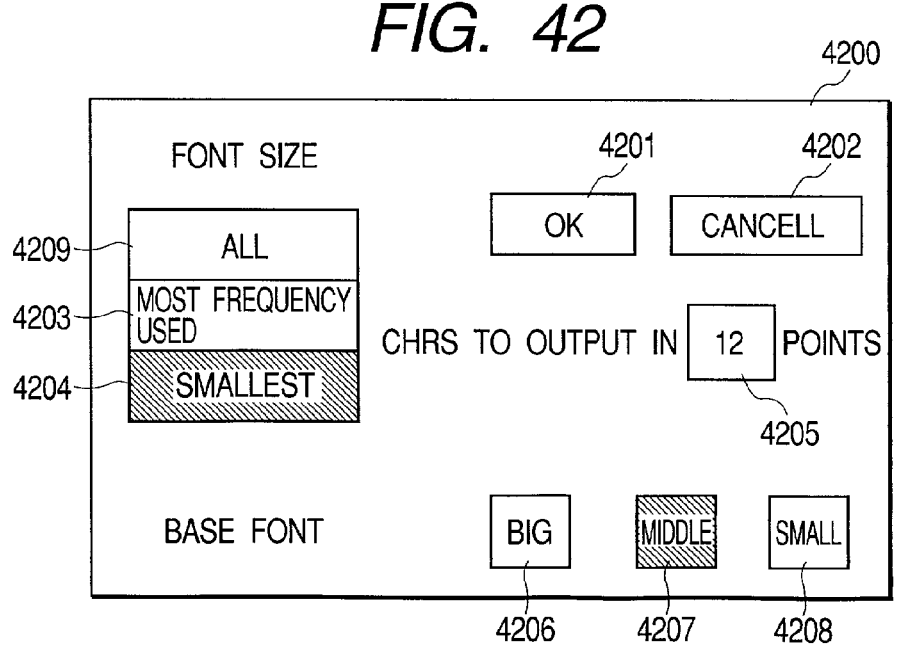
FIG. 42 is a view showing a part of the image displayable on an operation panel 1012.

In the present embodiment, the keyboard 9 and the CRT display 10 are not indispensable, but they are usually provided for the purpose of maintenance of the server computer and confirming the operation status thereof. As will be explained later, the CRT display 10 may be used for designating the font size to the printer 1000 as shown in FIG. 42.

A memory controller (MC) 7 controls the access to an external memory 11, which stores a boot program, various applications, font data, user files, editing files etc. The external memory 11 may be composed of a hard disk (HD), a floppy disk (FD), or any other memory medium capable of holding program and/or data.

A network controller (NTC) 8 is connected to the printer 1000 through a predetermined bidirectional interface (interface) 21 and executes communication control with the printer 1000. The CPU 1 can fetch the document data stored in the external memory 11 by controlling the memory controller 7 and can transfer the document data to the exterior by controlling the network controller 8.

In the printer 1000, there is also provided a printer CPU (CPU) 12 for collectively controlling the devices connected to a system bus 15 based on a control program stored in a program ROM contained in a memory unit 13 or a control program stored in an external memory 14 and outputs an image signal constituting output information to a printer engine 17 connected through a print unit interface 16. The memory unit 13 is often composed of a ROM for storing data such as programs or font data but may also be composed of another memory medium such as a small hard disk drive (HDD) or a detachable memory card.

The program ROM of the memory unit 13 may also be used for storing a control program for the CPU 12 as will be shown in a following flow chart.

A font ROM of the memory unit 13 is used for storing font data etc. to be used in generating the aforementioned output information. Also a data ROM of the memory unit 13 stores information to be used on the host computer 3000 in case of a printer lacking the external memory 14 such as a hard disk.

A CPU 12 is rendered capable of communication with the host computer through an input unit 18 and also of informing the host computer 3000 of information in the printer.

A RAM 19 functions as a main memory and a work area for the CPU 12 and is so constructed that the memory capacity can be expanded by an option RAM connected to an unrepresented expansion port.

The RAM 19 can be used as an output information development area, an environment data storage area, an NVRAM etc. The access to the aforementioned external memory 14 such as a hard disk (HD) or an IC card is controlled by a memory controller (MC) 20. The external memory 14 is connected as an option and is used for storing document data, font data, form data etc.

The aforementioned control panel 1012 is provided with switches for operation and an LED display unit.

Also the aforementioned external memory is not limited to one unit but can be provided in one or plural unit including an optional font card for the fonts in addition to the internal fonts or external memories storing a program for analyzing a printer control language of a different language system. Also there may be provided an unrepresented NVRAM for storing the printer mode set information entered from the operation panel 1012.

Figure 3:
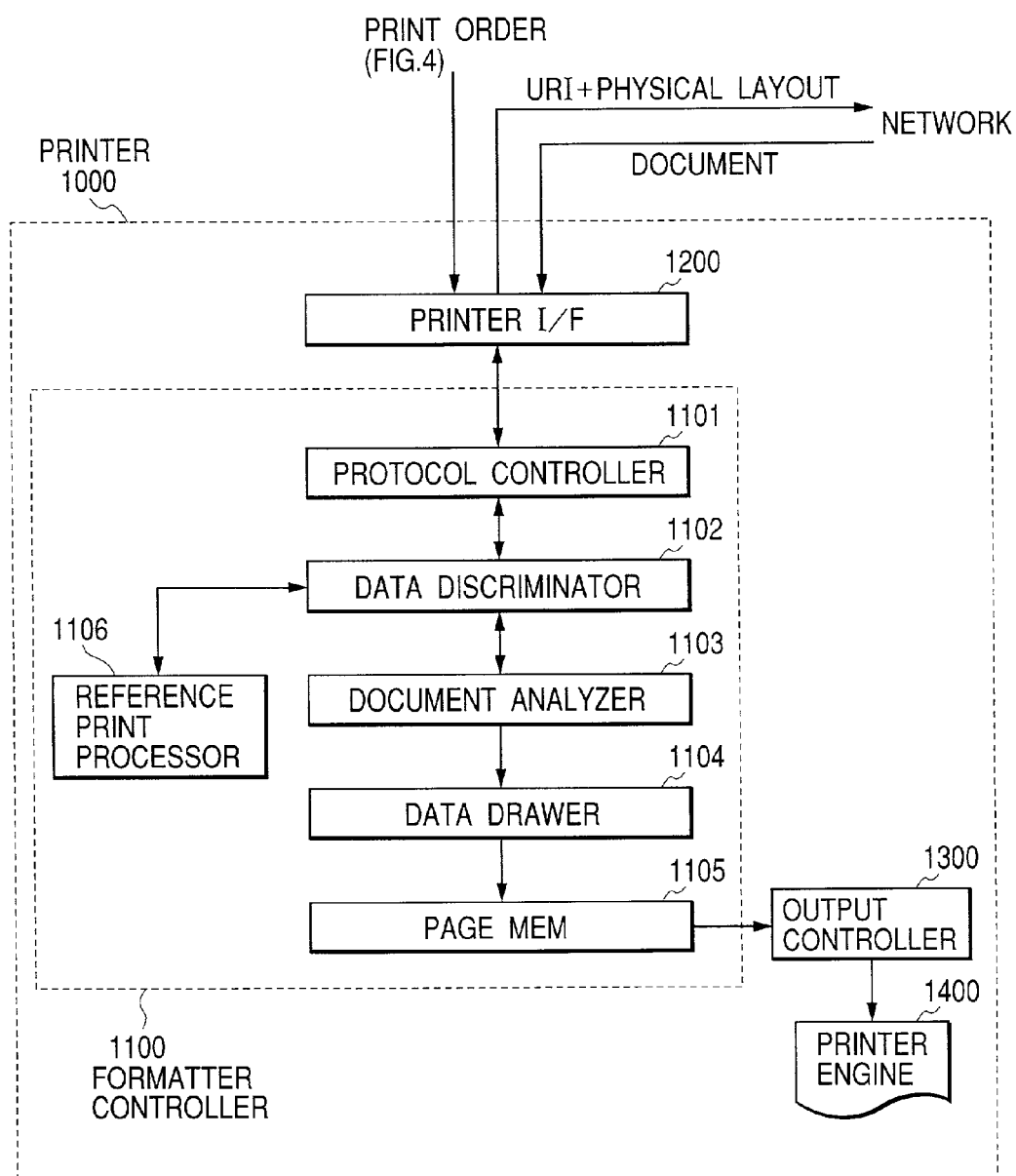
FIG. 3 is a block diagram showing the configuration of data processing in an image processing apparatus constituting an embodiment 1 of the present invention.

FIG. 3 is a block diagram showing the configuration of data processing in the image processing apparatus constituting a first embodiment of the present invention.

Referring to FIG. 2, the printer 1000 is principally composed of a formatter controller 1100, a printer interface 1200, an output controller 1300, and a printer engine 1400.

The formatter controller 1100 is composed of a protocol controller 1101, a data discriminator 1102, a document data analyzer 1103, a data drawer 1104, a page memory 1105, and a reference print processor 1106.

The printer interface 1200 is used for input/output with the exterior. The protocol controller 1101 executes communication with the exterior by analyzing and transmitting network protocol, and, in case of employing HTTP (Hyper Test Transfer Protocol) for the protocol, executes acquisition of a document designated by URI (unified resource identifier) or transmission of information to the web server. For the URI, there can be designated an URI capable of indicating the presence of the resources on the network. In the printing operation, a resource on the web server is designated in the reference print command. A device receiving thereference print command executes processing by acquiring the resource from the URI.

The data discriminator 1102 discriminates whether the received data are a reference print command or document data, and, respectively if the received data are discriminated as a reference print command or document data, the data are respectively transferred to the reference print processor 1106 or to the document data analyzer 1103.

The reference print processor 1106 extracts various information from the reference print command and transmits the necessary information to the exterior through the protocol controller 1101. The reference print command, of which a specific example will be explained later, is capable of acquiring a document by transmitting for example the URI of the document and the print set information.

In case the data received by the image forming apparatus are known in advance not to be a reference print command but to be document data, there can be conceived an embodiment in which the reference print processor 1106 and/or the data discriminator 1102 is dispensed with.

The document data analyzer 1103 analyzes the document data described by the structured description language and executes conversion into intermediate codes of a more easily processible format. The intermediate codes generated in the document data analyzer 1103 are transferred to and processed by the data drawer 1104.

The data drawer 1104 develops the aforementioned intermediate codes into bit map data, which are drawn in succession in a page memory 1105. The formatter controller 1100 is generally composed of a computer system employing a CPU, a ROM, a RAM etc.

The output controller 1300 converts the content of the page memory 11005 into a video signal and transfers the image to the printer engine 1400, which is a printing mechanism for forming a permanent visible image of the received video signal on a recording sheet.

Figure 22:
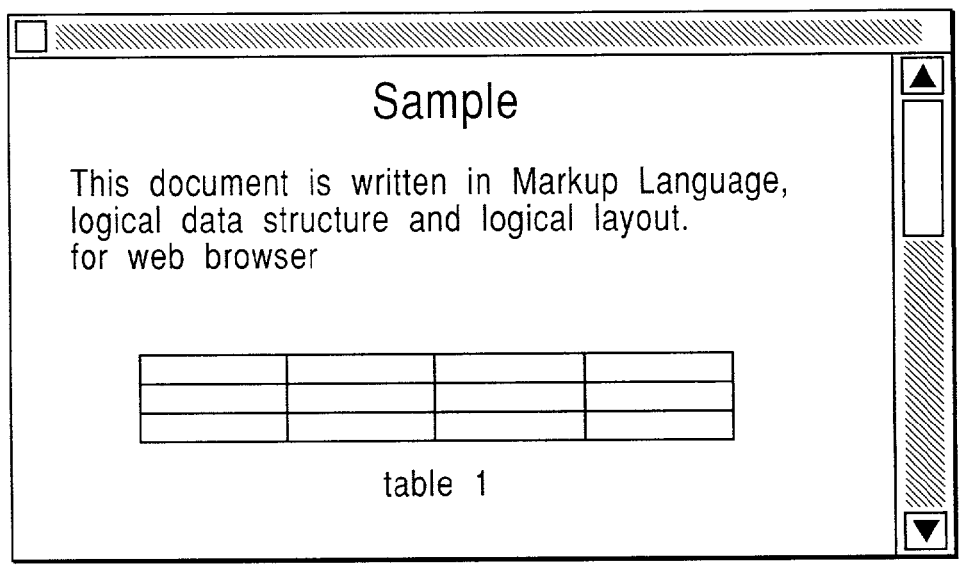
FIG. 22 is a view showing an example of a document information displaying image by a browser.

FIG. 22 shows an example of the document information display image by a browser stored for example in the document server 2004 and corresponds to a state where a document described by a structured description language without the concept of page is displayed by the browser. Also FIG. 23 shows an example of the print output of the document shown in FIG. 22.

As shown in FIG. 22, in the general browser, it is possible to change the size of the displayed image or to scroll the image in the vertical or horizontal direction by a scroll bar. FIG. 23 shows an example of the document described in the structured description language after formatting. In this mannere the document after formatting can be displayed or printed in the unit of a page.

On the other hand, since the document described by the structured description language does not require a particular application as explained in the foregoing, the printing is possible from a terminal not supporting the application if there is a printing apparatus capable of analyzing the structured description language.

Figures 4, 5:
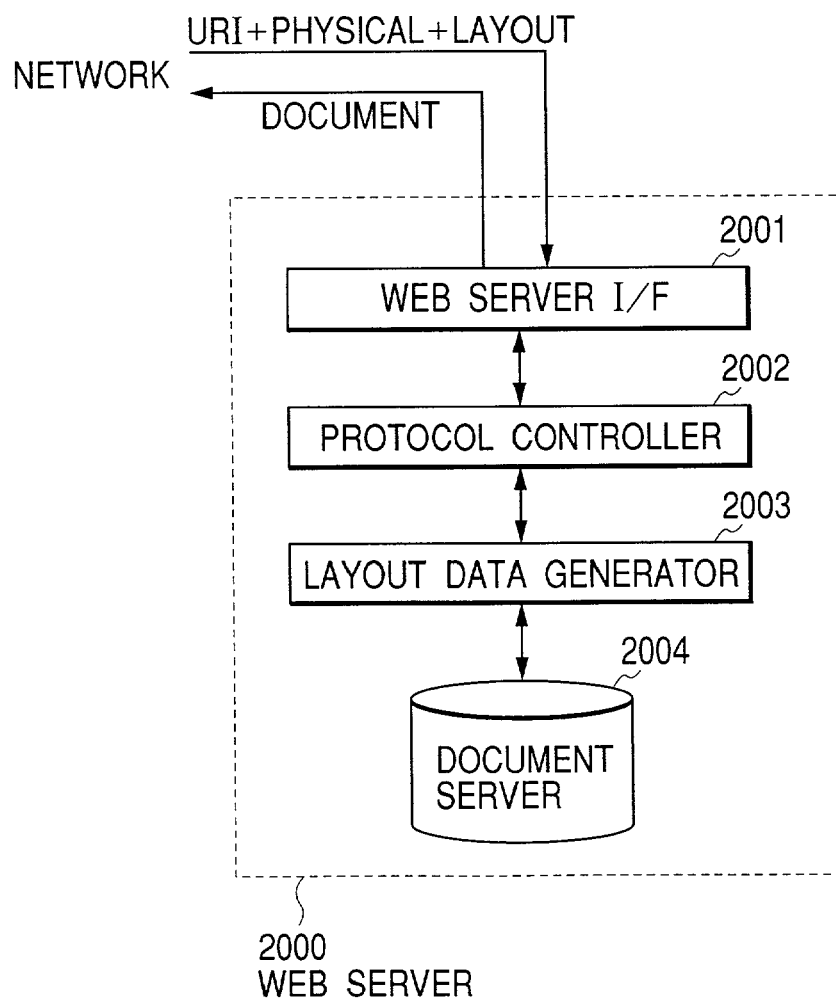
FIG. 4 is a view showing an example of the reference print instruction described in a structured description language in the image processing apparatus of the present invention.
FIG. 5 is a block diagram showing the configuration of a web server capable of communication with theimage processing apparatus of the present invention.
Figure 23:
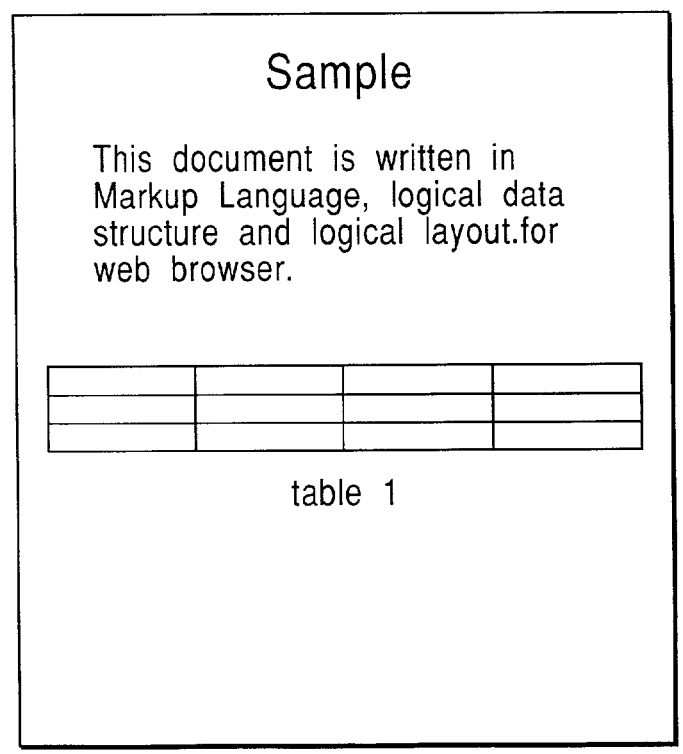
FIG. 23 is a view showing an example of the print output of the document shown in FIG. 22.

In the following there will be explained a technology for executing page layout on the document data described in the structured language as shown in FIG. 22 and executing output as shown in FIG. 23, by an example of reference printing. The document information on the web server can be printed by instructing the storage position of the document to the printing apparatus, for example from a portable information terminal or a portable telephone. Such print instruction is called a reference print instruction, which will be explained in more details with reference to FIG. 4. FIG. 4 shows an example of the reference print instruction, which is a print command including information on the location of the structured document to be subjected to page layout. The print command shown in FIG. 4 is described by the structured description language from a host (not shown in FIG. 4) to the printer 1000, but it need not necessarily be described by a structured description language.

In FIG. 4, a first row indicates that the data are not document data but a reference print instruction. The document data to be actually printed are desginated by the URI in a second row. The URI is the most common method for designating a document on the internet and will not, therefore, be explained in detail, but the second row is to request, by the HTTP protocol, a document entitled "mydocument" stored in the web server of a name "myserver.dom".

A third row designated the size of the output sheet. An A4-sized sheet is designated in the illustrated case. A fourth row designates the direction of layout. A portrait direction is designated in the illustrated case. A fifth row designates the base font size. An 8-point (8 pt) size is designated in the illustrated example. The base font size used herein is different from the standard font size to be explained later. The base font size is a font size constituting a base that can be defined in the structured document. If the font size is not designated, the display is ususally made with such base font size. Also in the structured document of the present embodiment, a display format instruction which designated the display format such as the desired font size or font style is defined in the form of a tag. Also a style sheet constitutes a portion where the user can independently define the information indicating the output format (for example font size, font style, Italic, underlined etc.) of the character information.

By applying such tag to a specified character or a specified character train in the structured document, such applied character or character train in the structured document is outputted in the form defined in the style sheet. The style sheet in the present invention is taken in the wide sense including a style applied by the formatter by automatic reading whenever necessary even without explicit instruction by the user. In the formatting process, the style sheet if provided is read simultaneously with the structured document for analyzing and outputting the tag information. The base font size in the present invention may also be defined in the style sheet, and is a default character size applied to a character or a character train unless another font size is instructed therefor. The structured document, if directly subjected to page layout, often contains information designating the font size. The command designating the font size can also be represented by a tag format, for example, in the HTML, by a character train </H1> indicating a title <H1> (this tag format indicates a larger title). If no font size is designated, the character train is usually outputted with the base font size. The object of the present invention is to output the character or the character train of the structured document with a desired font size (hereinafter called standard font size) designated by predetermined instruction input means. The instruction input means can be, for example, the operation panel 1012 of the printer 1000 or the input unit 18 of the printer 1000 receiving the input of instruction from the host computer 3000 through the network.

The document "mydocument" can be printed on a physical sheet by transmission of such simple instruction to the printing apparatus, without direct transmission of the document data thereto.

FIG. 5 is a block diagram showing the configuration of a web server capable of communication with the image processing apparatus of the present invention.

Referring to FIG. 5, the web server 2000 is principally composed of a web server interface 2001, a protocol controller 2002, a layout data generator 2003 and a document server 2004.

The web server 2001 executes input/output with the exterior. The protocol controller 1101 executes communication with the exterior by analyzing and transmitting the network protocol, and, for example in case of employing HTTP as the protocol, executes reception of information and transmission of the document designated by the URI. The layout data generator 2003 executes page layout of the document stored in the document server 2004.

The document server 2004 stores the document file described in the structured description language. For example the document data stored as a structured document in the document server 2004 are displayed by the web browser as shown in FIG. 22. Such document data are subjected to page layout by the layout data generator 2003 to generate layout data as shown in FIG. 23. Upon receiving the URI and the print set information from the printer 1000, the web server 2000 extracts the designated document from the document server 2004 and causes the data generator 2003 to execute page layout according to the designated print set information and to transmit the generated document data to the printer 1000.

The printer 1000 and the web server 2000 are connected through a network such as Internet.

In the following there will be explained, with reference to FIGS. 6 to 9, an example of the document data stored in the document server 2004 and those generated by the layout data generator 2003.

FIG. 6 shows an example of the document data stored in the document server 2004 shown in FIG. 5 and described in XML.

Referring to FIG. 6, the document data are merely showing the meaning of data by tagging thereto and cannot be subjected to page layout.

For example, in the third row, a tag <title> is attached to a character train data "Sample". Such tag means that the character train "Sample" is a "title" but does not include information on the size and position of layout.

The mode of layout of such document data is generally determined by applying a file called style sheet and describing the layout information.

FIG. 7 shows an example of the style sheet stored in the document server 2004 shown in FIG. 5, and, in the document data shown in FIG. 6, the top row designates the style sheet to be applied. Such style sheet may be stored in the document server 2004 or in the printer 1000 shown in FIG. 3.

In FIG. 7, second and third rows define the layout of "title". More specifically there is given a definition <font size=big font color=red position=center>, indicating that the title is to be positioned at the center of a row with a large-sized red-color font. Thus the document server 2000 stores the document data shown in FIG. 6 and the style sheet shown in FIG. 7.

FIG. 8 shows an example of the document data to be converted by the process of the layout data generator 2003 shown in FIG. 5, and corresponds to an example of the document data converted according to the document data shown in FIG. 6 and the style sheet shown in FIG. 7.

The example shown in FIG. 8 shows document data of a layout in a physical page, including the character size and the drawing position. For example the "title" shown in FIGS. 6 and 7 are drawn with a size of 24 points in a position (x, y)=(100, 0)(mm).

In the following there will be explained the entire print control sequence of the present embodiment in the print system including the image processing apparatus and the server apparatus of the foregoing configuration, with reference to flow charts shown in FIGS. 9 to 13.

Figure 9:
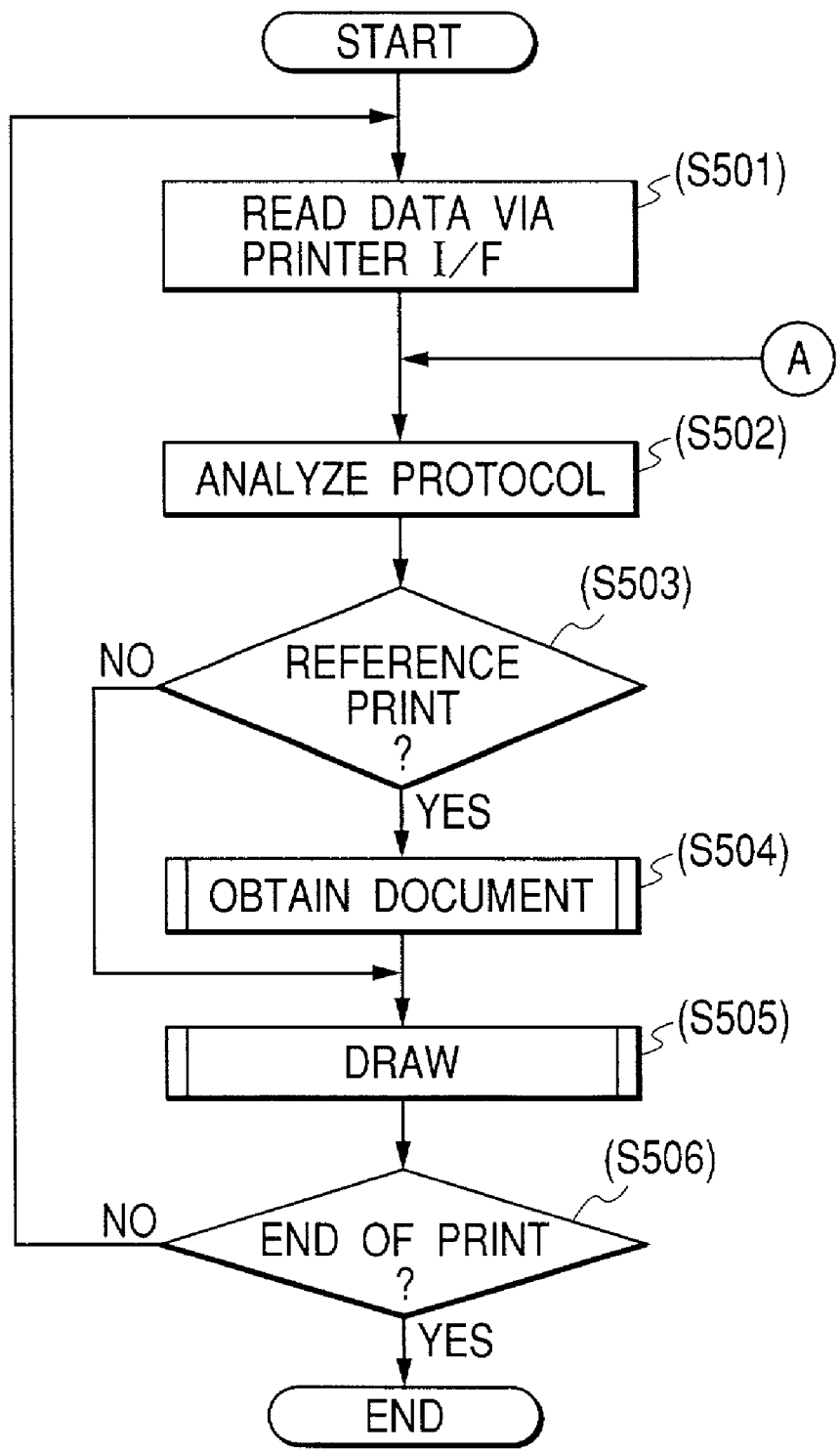
FIG. 9 is a flow chart showing an example of a first data processing sequence in the image processing apparatus of the present invention.

FIG. 9 shows the process in the printer 1000 constituting an embodiment of theprocess in the image processing apparatus of the present invention. FIG. 9 is a flow chart showing an example of a first data processing sequence in the printer 1000, and corresponds to a main process sequence from the start of the operation to the end thereof in the printer 1000 shown in FIG. 3, wherein S501 to S506 indicate process steps.

At first a step S501 receives the data from the network through the printer interface 1200. If the document data are present in the printer 1000 in advance, the process of the step S501 can be naturally dispensed with. Then a step S502 analyzes the protocol, and a step S503 discriminates whether the received data are a reference print instruction, and, if not, the sequence proceeds to a step S505 for executing a drawing operation, but, if the received are discriminated as a reference print instruction, the sequence proceeds to a step S504 for executing a document acquiring process and then a drawing process. Thereafter a step S506 discriminates whether the document data have ended, and, if ended, the printing operation is terminated, but, ifnot, the process from the step S501 is repeated. If the received data do not support the reference print instructing function, the process of the step S503 may naturally be omitted.

Figure 10:
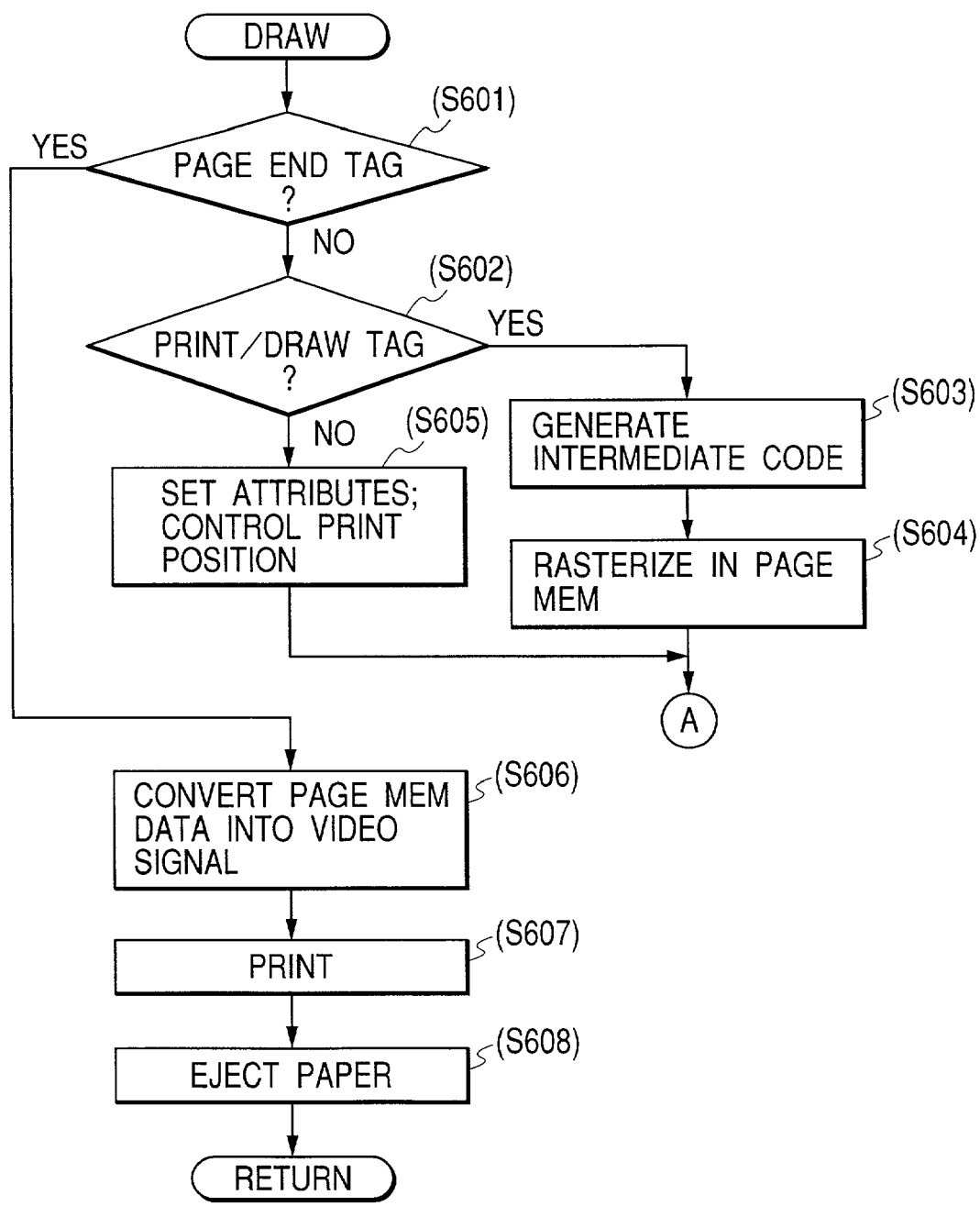
FIG. 10 is a flow chart showing an example of a second data processing sequence in the image processing apparatus of the present invention.

FIG. 10 is a flow chart showing an example of a second data processing sequence in the image processing apparatus of the present invention and corresponding to the details of the drawing process (actual printing process) in the step S505 shown in FIG. 9, wherein S601 to S608 show process steps.

At first in a step S601, the document data analyzer 1103 discriminates whether the tag is a page end tag, and, if affirmative, the sequence proceeds to a step S606 for processing such tag.

On the other hand, if the step S601 identifies that the tag is not a page end tag, a step S602 discriminates whether the analyzed tag requires a developing process into the page memory such as a character printing or a figure drawing, and, if not, the sequence proceeds to a step S605 for executing a process such as attribute setting or print position control according to the tag.

On the other hand, if the step S602 identifies that the tag requires development into the page memory, the sequence proceeds to a step S603 for generating intermediate codes for easier development into a bit map.

Then, in a step S604, the data drawer 1104 executes a developing process into the page memory 1105 in response to such intermediate codes. After the development process, the sequence returns to the step S502 shown in FIG. 9 for repeating the analyzing process for the document data.

On the other hand, if the step S601 identifies a page end tag, the sequence proceeds to a step S606 in which the output controller 1300 converts the content of the page memory 1105 into a video signal for the printer engine 1400 and executes image transfer.

Figure 11:
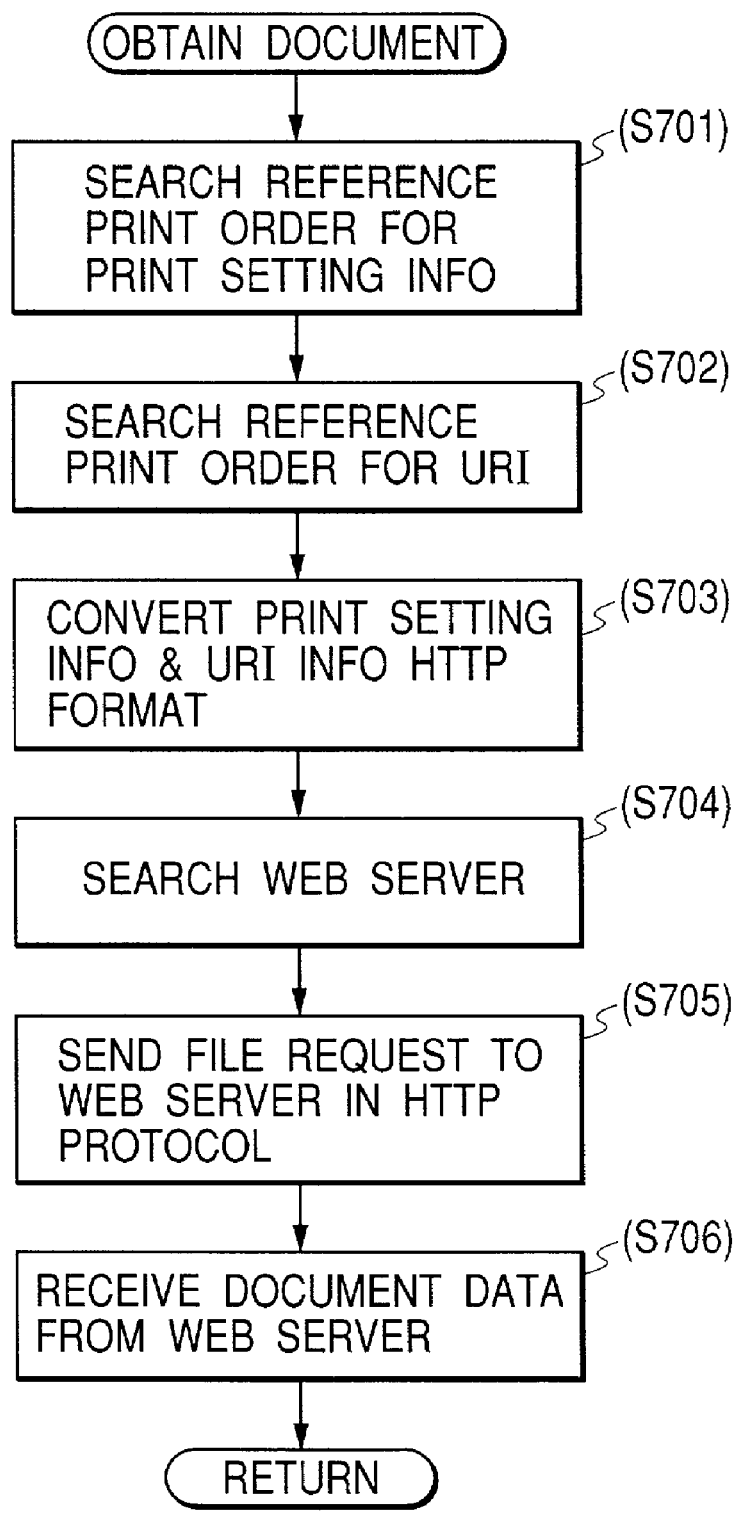
FIG. 11 is a flow chart showing an example of a third data processing sequence in the image processing apparatus of the present invention.

Then, in a step S607, the printer engine 1400 executes printing by forming a permanent visible image of the received video signal on a recording sheet. Then a step S608 discharges the print result whereupon the print control process for a page is terminated. FIG. 11 is a flow chart showing an example of a third data processing sequence in the image processing apparatus of the present invention and corresponding to the details of the document acquiring process (process of acquiring the document to be printed) in the step S504 shown in FIG. 9, wherein S701 to S706 show process steps.

At first a step S701 searches the print set information described in the reference print instruction. In the example shown in FIG. 4, the "A4" sheet size, the "portrait" layout direction and "8 points" which is a font size instructed or entered into the predetermined instruction input means correspond to the print set information. The print set information means information to be referred to at the output in the printing apparatus or information to be used in formatting of the document data into the physical page by the image processing apparatus, and includes, for example, the font size, resolution of the print, effective print area, size of the output sheet, printing direction, one-side or two-side printing setting, information for reducing the toner amount, and information on the finishing process such as presence or absence of stapling.

Then a step S702 searches the URI described in the reference print instruction. In the example shown in FIG. 4. "http://myserver. com/mydocument" corresponds to such URI.

Then the sequence proceeds to a step S703 for converting the detected URI and the print set information into the HTTP format, whereby the preparation for information transmission is completed. The above-described steps are executed in the reference print processor 1106 while the following steps are executed by the protocol controller 1101.

Then a step S704 searches the web server 2000 designated by the URI, and a step S705 transmits a file acquisition request to the web server 2000 by the HTTP protocol. Then a step S706 receives (acquires) the document data transferred from the web server 2000, whereupon the sequence is terminated.

Figure 12:
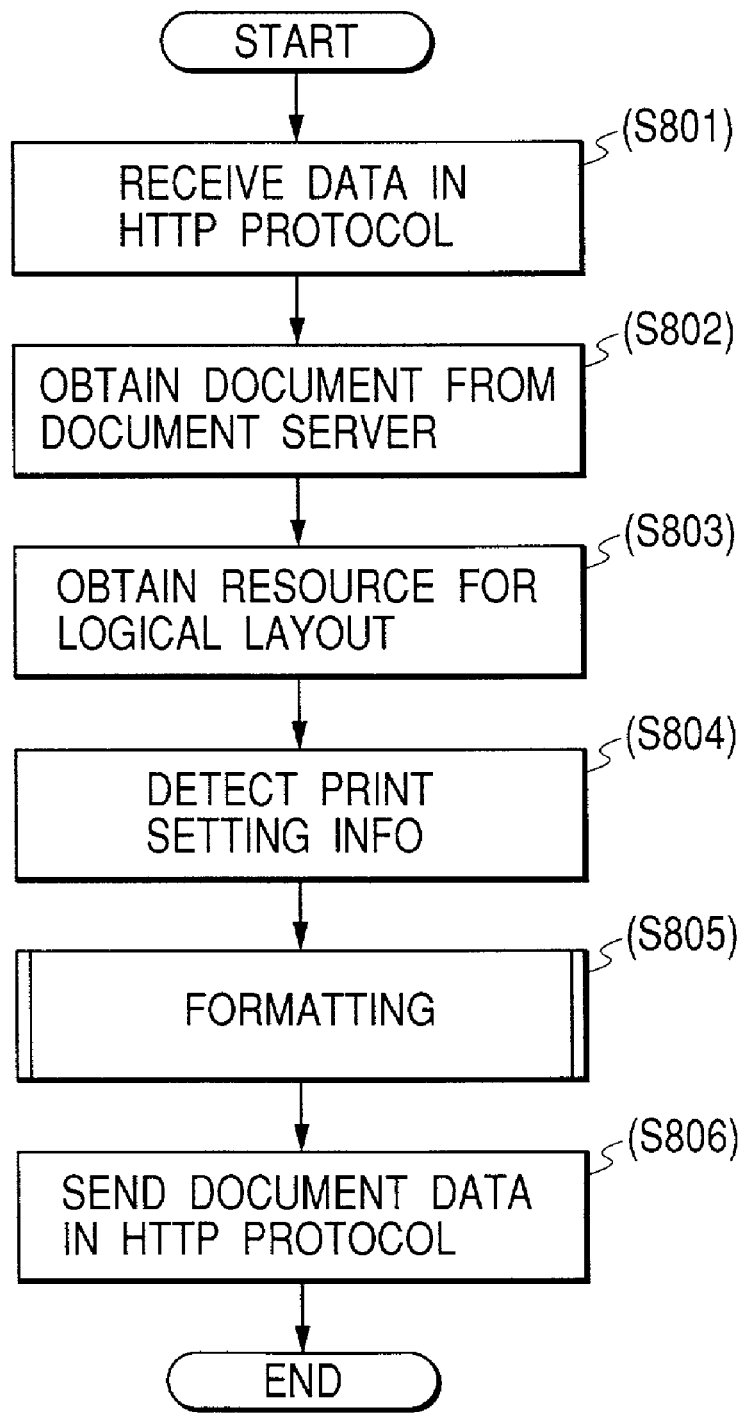
FIG. 12 is a flow chart showing an example of a first data processing sequence in a server apparatus of the present invention.

FIG. 12 is a flow chart showing an example of a first data processing sequence in the server apparatus of the present invention and corresponding to a main process sequence from the start to the end of the operation of the web server 2000 shown in FIG. 5, wherein S801 to S806 show process steps.

At first step S801 receives the data from the network by the HTTP protocol. This process is executed by the web server interface 2001.

Then a step S802 fetches the document information, designated by the URI, from the document server 2004, and a step S803 acquires the resources required for layout. The style sheet shown in FIG. 7 constitutes such resource required for the layout.

Then a step S804 detects the print set information informed by the HTTP protocol, and a step S805 executes the formatting process. More specifically, the step S805 executes the actual page layout process (formatting process) on the physical page, utilizing the information and resources collected in the steps S802 to S804 and required for the page layout.

When the formatting process in the step S805 is completed, the sequence proceeds to a step S806 for transmitting the document data subjected to the page layout on the physical page, whereupon all the process is terminated.

Figure 13:
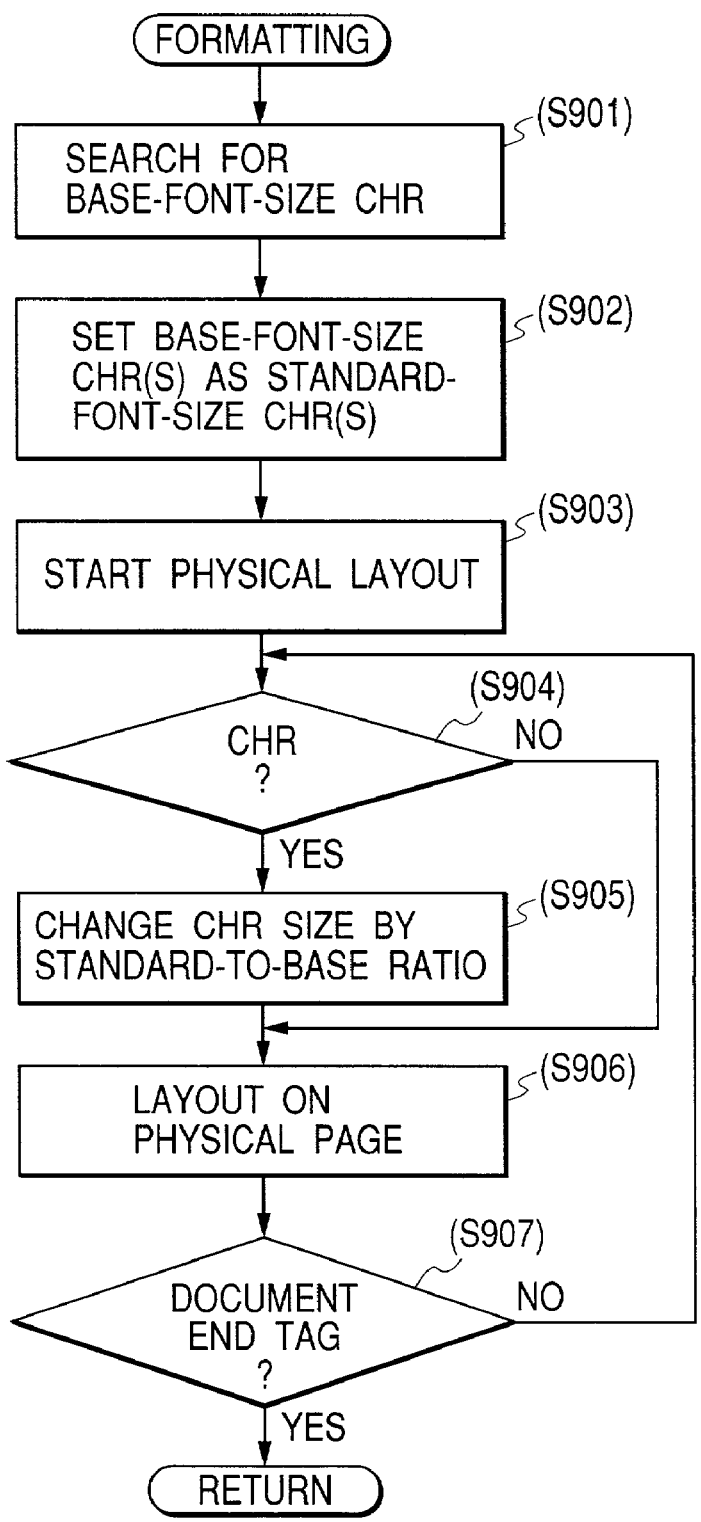
FIG. 13 is a flow chart showing an example of a second data processing sequence in the server apparatus.

FIG. 13 is a flow chart showing an example of a second data processing sequence in the server apparatus of the present invention and corresponding to the details of the formatting process (layout process to the physical page) shown in FIG. 12, wherein S901 to S907 show process steps.

The printer executes processing, utilizing the document data described in the structured description language, the font size information in the aforementioned document data and the font size entered by the user and to be set in the character information at the page layout of the document data. For example, the aforementioned font size information includes a minimum font size set for the characters contained in the structured document, a most frequent font size appearing most frequently therein, or a base font size which is a default font size set for the structured document to be processed. Hereinafter, a font size entered by the user from the input unit of the printer or the host computer and to be used for a character indicated by the character information contained in the document information at the output on the sheet or on the print preview image is called the standard font size. A character train to which specified font size information is applied is recognized by analyzing means, and the character train to which such font size information is applied is outputted with the standard font size entered by the instruction input means. The font size information means information on the font size contained in the structured document to be processed. Even if the font size information is applied, the printer executes page layout and output of the character or the character train with thus set desired font size. Also at the page layout, the standard font size to be set on a character indicated by the character information is designated by the predetermined instruction input means. The instruction input means includes an input unit capable of designating the font size such as the operation panel 1012 of the printer 1000 or a keyboard KB9 of the host computer connected to the printer 1000. The standard font size can be entered from a remote location by utilizing the host computer 3000 in which mounted is a software for controlling the printer 1000. It is also conceivable to store in the memory unit 13 of the printer, prior to the layout process, for example at the forwarding from the manufacturing factory or at the installation of the printer. The instruction means may also include selection instructing means (not shown) for reading the information (plural) indicating the font sizes and stored in such memory unit 13 and smanually or automatically selecting the information (singular) indicating the desired font size by selection means from such font-size indicating information (plural). Such selection instructing means may be provided in the printer or in the host computer. Also the font size information in the document data is similarly selected or set in the memory unit 13 by the host computer or the printer 1000 in advance or in interactive manner.

In the following there will be explained the flow of the aforementioned process. At first a step S901 searches a character to which applied is the base font size indicating the base of the font size the document. In the present embodiment, it is assumed that the character or character train is selected in advance by "base font size" from the operation panel 1012 of the printer or the input unit of the host computer, as shown in FIG. 42. In the example shown in FIG. 4, the "base font size" described in the document, namely the character of 8 points corresponds to the base font size. Then a step S902 so sets that the character or character train to which the "base font size" is applied becomes the standard font size designated from the operation panel 1012. More specifically, if the standard font size designated from the operation panel 1012 is 10 points, there is executed a scaling operation of converting the character of 8 points into that of 10 points. It therefore becomes unnecessary, in changing the structured document, to activate an application each time in the host computer, and the user is merely required to set the font size by the operation panel of the printer and to transmit the structured document to the image processing apparatus.

Then a step S903 starts the physical layout process, thereby allotting the document data in succession to physical pages. Then a step S904 discriminates whether the document data contain a character, and it not, the sequence proceeds to a step S905.

On the other hand, if the step S904 identifies that a character is contained, a step S905 calculates the font size to be outputted in consideration of the proportion with the standard font size, and a step S906 continues the layout to the physical pages. For example a character of 12 points is shifted to a size of 12×(10/8) points. In this manner the process from the step S904 is repeated until a step S907 detects an end tag for the document data, and the process is terminated when the end tag is detected.

In the following there will be explained, with reference to FIGS. 14 to 16, specific examples of the output results in the present embodiment.

Figure 14:
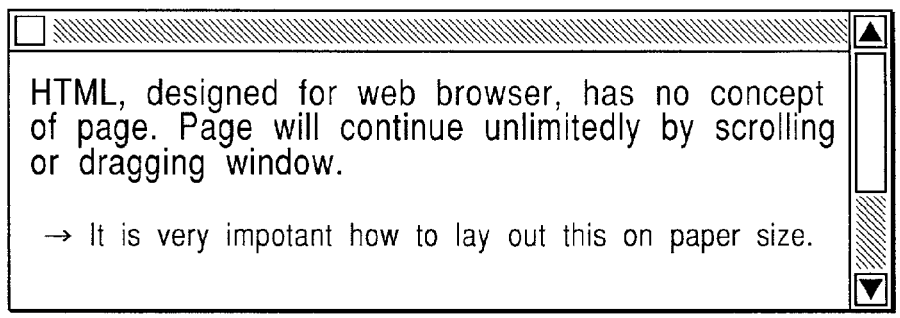
FIGS. 14, 15 and 16 are views showing the results of document data output process in the first embodiment of the present invention.
Figure 15:
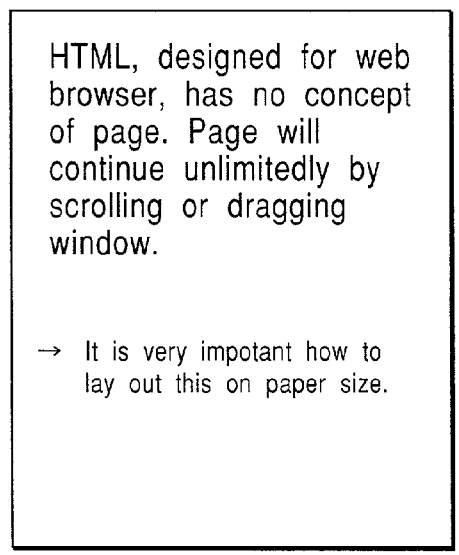
Figure 16:
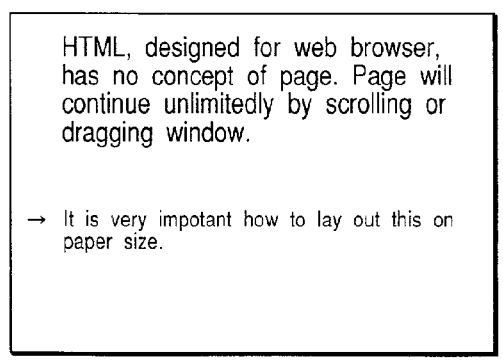

FIGS. 14 to 16 show the results of the document data outputprocess in the first embodiment of the present invention, wherein FIG. 14 shows an example of display by the browser of a document described by a structured description language lacking the concept of page, while FIG. 15 shows the result of output when the standard font size is designated at "12 points", and FIG. 16 shows the result of output when the standard font size is designated at "8 points".

The characters are larger and amply spaced as shown in FIG. 15 when the standard font size is set at 12 points. ON the other hand, when the standard font size is set at 8 points, it is desirable to employ a more compact layout as shown in FIG. 16.

Second Embodiment

In the foregoing first embodiment, there has been explained a case of employing XML as the description language for the document stored in the document server 2004. In the present embodiment, there will be explained a case of employing HTML with reference to FIGS. 17 and 18.

Figures 17, 18:
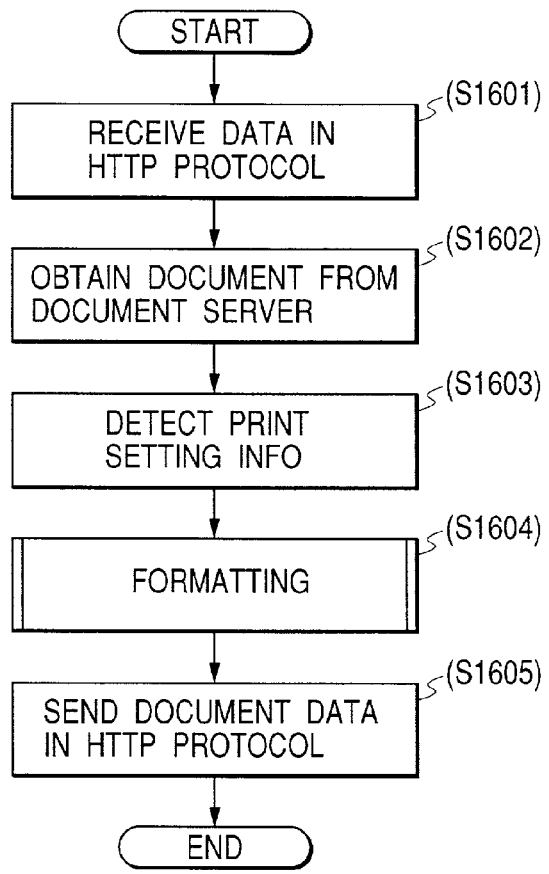
FIG. 17 is a flow chart showing a data processing sequence in a server apparatus constituting a second embodiment of the present invention.
FIG. 18 is a view showing a specific example of HTML document data processed in the server apparatus constituting the second embodiment of the present invention.

FIG. 17 is a flow chart showing the data processing sequence of the server apparatus in a second embodiment of the present invention and corresponding to the main process from the start tothe end of the operation of the web server 2000, wherein S1601 to S1605 show process steps.

At first a step S1601 receives the data from the network by the HTTP protocol. This process is executed by the web server interface 2001.

Then a step S1602 fetches a document designated by the URI from the document server 2004. In the foregoing first embodiment, there is executed a process for acquiring the resource required for layout, but this process is unnecessary in the present embodiment since HTML contains the layout information. Then a step S1603 detects the print set information informed by the HTTP protocol, and a step S1604 executes a formatting process. Thus the layout process on the actual physical page is executed solely by the information in the steps S1602 and S1603.

The formatting process in the step S1604 is similar to that in the first embodiment and will not, therefore, be explained further.

When the process in the step S1604 is completed, the sequence proceeds to a step S1605 to transmit the document after the layout on the physical page by the HTTP protocol, whereupon all the processes are terminated.

A specific example of the HTML document data employed in the present embodiment.

FIG. 18 shows a specific example of the document data by HTML, to be processed by the server apparatus in the second embodiment of the present invention.

In FIG. 18, a <HI> tag in the third row defines the display in the largest font. Since HTML contains the layout information in the description language itself in this manner, the process sequence can be simplified in comparison with that of the first embodiment.

Third Embodiment

In the foregoing first embodiment, there has been explained a case of executing the formatting process in the web server. In the present embodiment, there will be explained a case of executing the formatting process in the printing apparatus, with reference to FIGS. 19 and 20.

Figure 19:
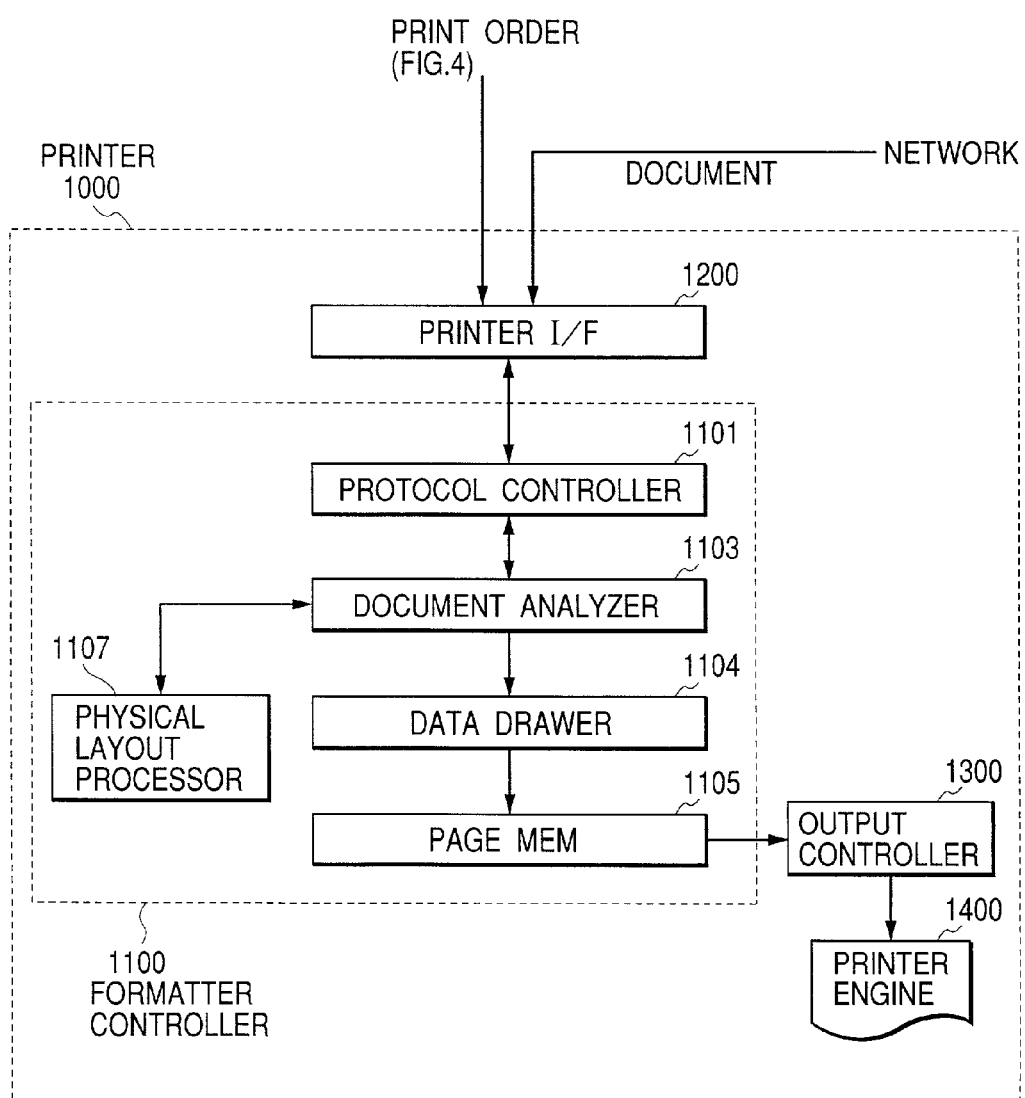
FIG. 19 is a block diagram showing the configuration of an image processing apparatus constituting a third embodiment of the present invention.

FIG. 19 is a block diagram showing the configuration of an image processing apparatus in a third embodiment of the present invention, wherein components similar to those in FIG. 3 are represented by like numbers.

Referring to FIG. 19, a printer 1000 is principally composed of a formatter controller 1100, a printer interface 1200, an output controller 1300 and a printer engine 1400.

The formatter controller 1100 is composed of a protocol controller 1101, a document data analyzer 1103, a data drawer 1105, a page memory 1105 and a physical layout processor 1107.

The printer interface (printer I/F) 1200 executes input/output with the exterior.

The protocol controller 1101 executes communication with the exterior by analyzing and transmitting the network protocol. The physical layout processor 1107 executes allotment of the structured description language, namely the formatting process.

The document data analyzer 1103 analyzes the document data described by the structured description language and executes conversion into intermediate codes of a more easily processible format. The intermediate codes generated in the document data analyzer 1103 are transferred to and processed in the data drawer 1104.

The data drawer 1104 develops the aforementioned intermediate codes into bit map data, which are drawn in succession in a page memory 1105. The formatter controller 1100 is generally composed of a computer system employing a CPU, a ROM, a RAM etc. The output controller 1300 converts the content of the page memory 1105 into a video signal and transfers the image to the printer engine 1400.

The printer engine 1400 is a printing mechanism for forming a permanent visible image of the received video signal on a recording sheet.

Figure 20:
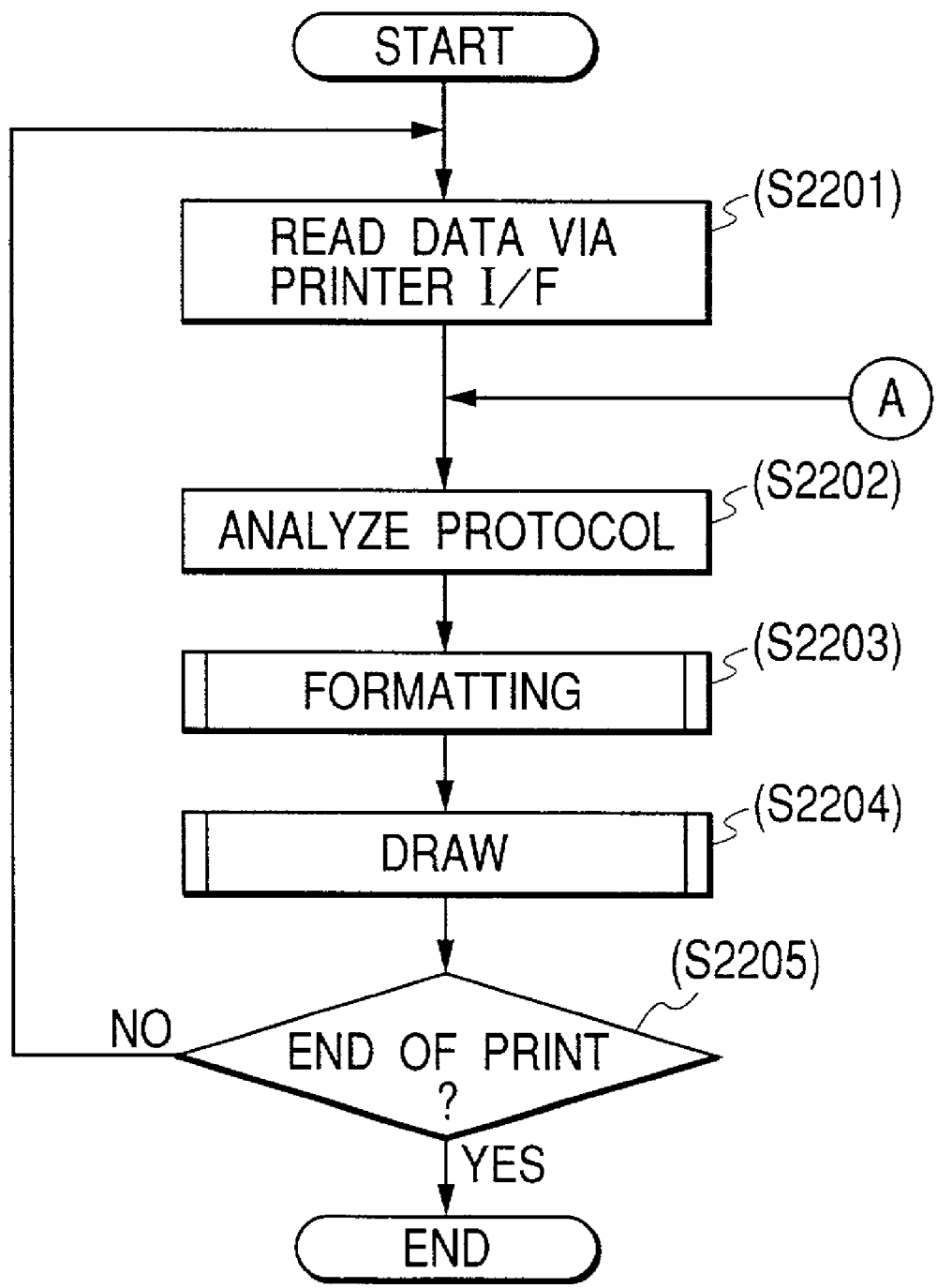
FIG. 20 is a flow chart showing an example of a fourth data processing sequence in the image processing apparatus of the present invention.

FIG. 20 is a flow chart showing an example of a fourth data processing sequence in the image processing apparatus of the present invention, and corresponding to a main processing sequence from the start of the operation to the end thereof of the printer 1000 of the present embodiment shown in FIG. 19. In process steps S2201 to S2205, a formatting process in a step S2203 and a drawing process in a step S2204 are similar to those in the first embodiment and will not, therefore, be explained in detail.

At first a step S2201 receives the data from the network through the printer interface 1200. Then a step S2202 analyzes the protocol, and a step S2203 executes the formatting, namely the allotment to physical pages. Thereafter a step S2204 executes the drawing process.

Then a step S2205 discriminates whether the document data have ended, and, if ended the printing operation is terminated.

On the other hand, if the step S2205 identifies that the document data have not ended, there is repeated the process from the step S2201.

In the foregoing first embodiment, the base font size is designated by the reference print instruction, but it may also be designated by another method such as the designation from the operation panel.

Also in the third embodiment, the base font size may be designated together with the document data.

For example in case the base font size is attached in advance to the document data, it can be set as an initial value in case the base font size is not designated.

In the foregoing first to third embodiments, the standard font size for the page layout is designated by a point size, but such font size may be simplied for example to "large", "medium" and "small". Such configuration may be realized for example by setting in advance correlations of "large"=8 points, "medium" is 10 points and "small" is 12 points.

Also in the foregoing first embodiment, there has been explained a case of describing the reference print instruction by the structured description language, but such description need not necessarily be in the structured description language as long as it instructs the output of the document data of the structured description language. For example the instruction can be made solely by the HTTP protocol.

Also in the first embodiment, there has been explained a case where the document server is a component constituting the web server, but the document server may be provided externally, for example as a hard disk of another personal computer.

Also in the first embodiment, the information relating to the physical page layout is informed from the information designated by the reference print instruction, but there may also be informed information that is designated in the reference print instruction as long as such information is referred to at the layout operation.

For example the resolution specific to the printing apparatus may be informed for executing more rigorous physical page layout.

Also the foregoing first to third embodiments may be combined to realize a configuration capable of switching the process according to the difference in the resources of the server apparatus or in the data processing ability thereby achieving efficient development and high-speed printing of the document information designated by the user.

The present invention also includes constructing a print system from an image processing apparatus and a server apparatus provided with various means relating to the present invention or from an image processing apparatus and a server apparatus capable of executing the process steps. In this manner there can be provided a print system capable, by formatting on an arbitrarily designated character size as a base, of realizing page layout of high freedom, thereby selecting outputs according to the taste of various generations from the aged persons to children.

In the following there will be explained, with reference to a memory map shown in FIG. 21, the configuration of a data processing program readable by a print system in which the image processing apparatus and the server apparatus of the present invention are applicable.

FIG. 21 shows a memory map of a memory medium storing various data processing programs readable by the print system in which the image processing apparatus and the server apparatus of the present invention are applicable.

Though not particularly illustrated, there may also be stored information for managing programs stored in the memory medium, such as version information or author, and information on the operating system etc. dependent on the program reading side, for example an icon for identifying the program.

Also data belonging to various programs are managed by the above-mentioned directory. There may also be stored a program for installing various programs into the computer and a decompressing program in case the programs to be installed are compressed.

In the analysis of the document information described in the predetermined structured description language, the document information acquired from the server apparatus is allotted to the physical page based on the designated font size. It is therefore possible to execute layout of the document information described with the predetermined structured description language, utilizing the specified character size designated by the user as the base, thereby realizing page layout of high freedom and selecting outputs according to the taste of various generations from the aged persons to children.

Also since the font size designated by the user is transmitted as the print set information, in addition to the reference print instruction, to the server apparatus where the document information is to be acquired and the document information subjected to layout in such server apparatus according to such print set information is acquired and outputted, there can be outputted the document information in various page layouts according to the taste of the user, without applying a burden of drawing on the image processing apparatus.

It is therefore rendered possible to execute the page layout of the document information, in the image processing apparatus or in the server apparatus, in which the size of each character in the document information managed by the server apparatus is rescaled based on the base character size intended by the user, thereby arbitrarily constructing the environment of the image processing system capable of easily obtaining the optimum output of document information of a layout with the character size according to the taste of various generations from the aged persons to children.

Fourth Embodiment

Figure 24:
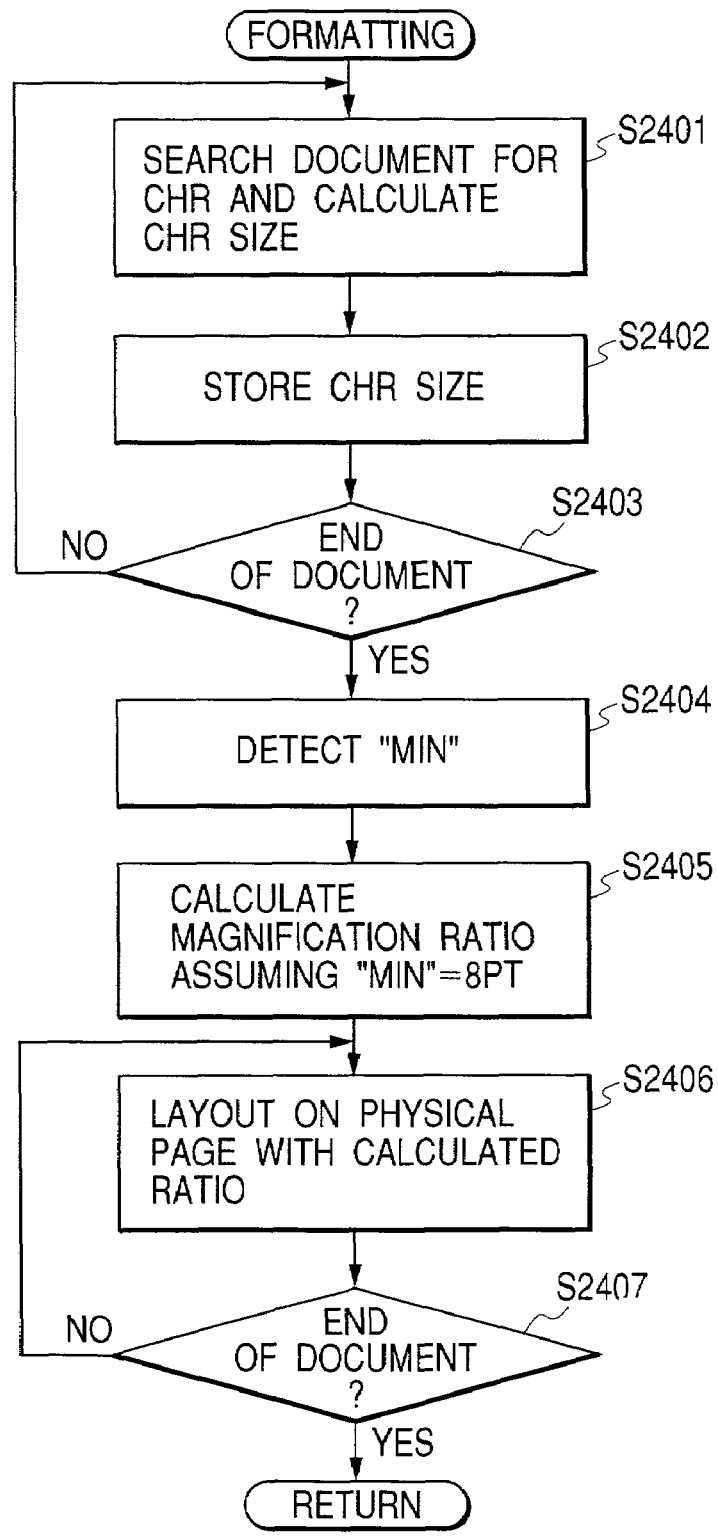
FIG. 24 is a flow chart showing a formatting process in a fourth embodiment.

FIG. 24 is a flow chart showing the details of formatting process shown in the step S2203 in FIG. 20, namely the layout process to the physical page in the physical layout processor 1107.

In the following there will be explained the difference from the foregoing embodiments. In the following there will be explained a case where the minimum font size is selected as the font size information. More specifically, the minimum character size and the character to which the minimum font size is applied are recognized in the document data described with the structured description language. Based on the recognized minimum character size and the font size designated by the predetermined instruction means, the layout is executed by varying the font size of the character information contained in the document data, so as to output the character or character train, to which the minimum character size is applied, with thus designsnated font size.

At first a step S2401 searches the document data from the start thereof, thereby detecting character data and calculating the character size upon each detection, and a step S2402 stores thus calculated character size. Then a step S2403 discriminates whether all the document data have been searched, and the process of the steps S2401 to S2402 is repeated until all the search has been completed, thereby completing a list of the character sizes used in the document.

In case the step S2403 identifies that all the document data have been searched, the sequence proceeds to a step S2404 to recognize the minimum character size min from the stored list of the character sizes. Then a step S2405 calculates a magnification rate when the detected minimum character size is assumed to be 8 points. The output font size of 8 points is entered from the operation panel 1012 of the printer 1000. It may also be entered by a graphical user interface (to be explained later in FIG. 42) of the image displayed on the CRT 10 of the host computer and through the network and the input unit 18 of the printer and stored for example in the RAM 19. As this magnification rate is used as the base of the physical layout, a step S2406 utilizes this magnification rate in executing the allotment to the physical pages starting from the top of the document.

Then a step S2407 discriminates whether the allotment to the physical pages has been completed for all the document data, and the allotment process of the step S2406 is repeated until the completion of the allotment.

In the following there will be shown a specific example of the formatting process shown in FIG. 24. For example 6, 8 and 10 points are listed by the steps S2401 to S2403 as the character sizes used in the document, the step S2404 detects 6 points as the minimum character size min. Then the step S2405 calculates a magnification rate of 8/6 for obtaining a character size of 8 points. Thus, other listed character sizes of 8 and 10 points are allotted to the physical page with the respective sizes of 8×(8/6) and 10×(8/6) points. Not only the characters but also other figures (objects) such as a table or a border line are allotted to the physical page by multiplying such magnification rate 8/6.

In the following there will be shown a specific example of the result of formatting process in the present embodiment. FIG. 27 shows an example of the input document data described by HTML, and such document data are converted by the formatting process of the present embodiment into a configuration capable of page layout as shown in FIG. 29. Also FIG. 28 shows the result of actual printing of the document data shown in FIG. 29.

In the present example, since the size of the smallest character ("table 1") in FIG. 27 is 4 points, the magnification rate is calculated as 8/4=2. Therefore, if the size of the title characters ("Sample") in FIG. 27 is 14 points and the base font size for other characters ("This document . . . web browser") is 6 points, FIG. 29 indicates that the conversion is so made as to obtain the title of a character size of 28 points, other characters of a size of 12 points and the minimum character size of 8 points. Also since this magnification rate (2 times) is applied to a table object, the table is allotted to the pages in a two-divided form.

In the present embodiment, as explained in the foregoing, at the formatting of the structured description language, the physical layout is achieved based on the minimum character size which is font size information, thereby enabling appropriate allotment into each page.

The calculation of the aforementioned magnification rate has been explained by a case of enlarging the minimum character size, detected in the structured description language, to 8 points, but the present invention is not limited to limited to such case but is applicable also to a case of calculating the magnification rate for enlargement to other sizes.

Also in case of determining the character size based on the calculated magnification rate, there may be employed not only the mere multiplication of the magnification rate but also an optimizing process such as rounding to an appropriate point number (namely a point number normally utilized in the system).

Fifth Embodiment

In the following there will be explained a fifth embodiment of the present invention, by the differences thereof.

In the foregoing first embodiment, there has been explained a case of recognizing and utilizing the minimum character size as the font size information set in advance or in an interactive manner. Also the second embodiment is featured by a fact that the base value is set according to the maximum width of the object. The object means a drawn figure other than a character and corresponds to a table or an image in the HTML document.

Figure 25:
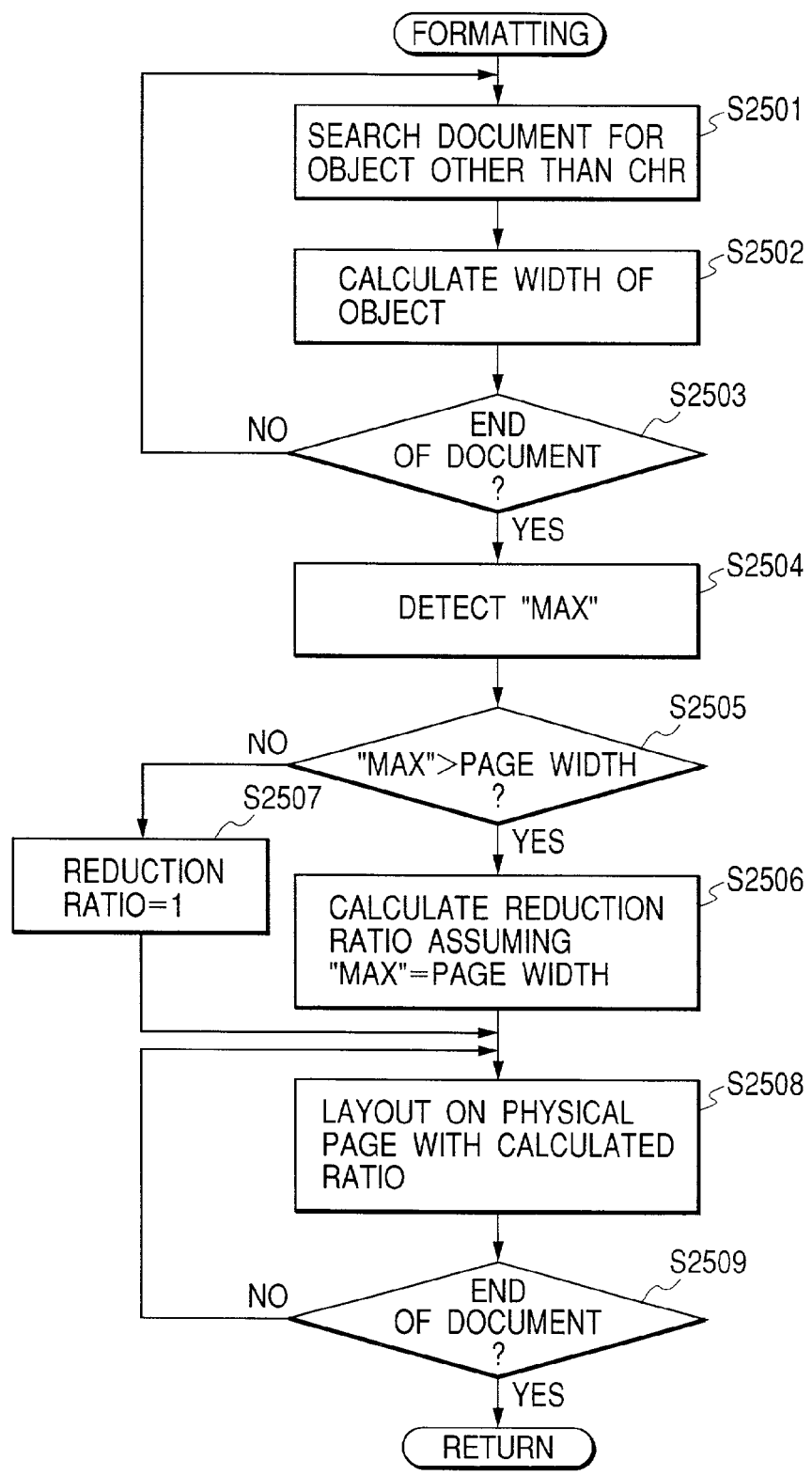
FIG. 25 is a flow chart showing a formatting process in a fifth embodiment.

FIG. 25 is a flow chart showing the formatting process in the fifth embodiment. The system configuration of the fifth embodiment, and the main sequence and drawing process in the printing operation thereof are similar to those in the aforementioned fourth embodiment and will not, therefore, be explained further. In the following there will only be explained the differences from the foregoing embodiments.

At first a step S2501 searches the document data from the start, looking for an object other than the characters. For example, in case of HTML, there can be searched a tag suchas "<TABLE>" OR "<img>".

Then a step S2502 calculates the width of the detected object. For example, if the object is a table, the width can be calculated according to the width information designated in such table or a character size described in the table. Also in case of an image, the width can be calculated from the image information described in the header of the data format.

Then a step S2503 discriminates whether the search has been completed for all the document data, and the process of the steps S2501 to S2502 is repeated until the search is completed, thereby completing a list of the widths of the objects used in the document.

In case the step S2503 identifies that all the document data have been searched, the sequence proceeds to a step S2504 to detect the maximum object width max from the stored list of the object widths. Then a step S2505 compares the detected object width max with the width of the page. The page width means the physically printable length in the recording sheet in the main scanning direction.

If the maximum object width max does not exceed the page width, the sequence proceeds to a step S2507 for setting the reduction rate at 1. On the other hand, if the maximum object width max is larger than the page width, the sequence proceeds to a step S2506 for calculating the reduction rate in case the maximum object width max is regarded as the page width. The reduction rate thus determined is used as the base for the physical layout, and a step S2508 executes the allotment to the physical pages in succession from the start of the document, utilizing such reduction rate.

Then a step S2509 discriminates whether the allotment to the physical pages has been completed for all the document data, and the allotment process of the step S2508 is repeated until the process is completed.

In case of document data not provided with non-character object, namely consisting solely of characters, the step S2501 does not detect any object. In such case, the allotment to the physical page is executed by setting thereduction rate is, though such step is not particularly shown in the flow chart in FIG. 25. For this purpose, there may be provided a step of setting the maximum object width max at the minimum value (for example 0) in case the step S2501 does not detect the object.

In the following there is shown a specific example of the formatting process shown in FIG. 25. For example, if the steps S2501 to S2503 list 2000 and 5000 dots as the object widths used in the document, the step S2504 detects 5000 dots as the maximum object size max. On the other hand, in case of using an A4-sized recording sheet with a printer resolution of 600 dpi, the page width is 4720 dots in case such recording sheet is conveyed longitudinally. Thus the step S2505 identifies that the maximum object size max (5000) is larger than the page width (4720), so that the step S2506 calculates the reduction rate as 4720/5000. The allotment to the physical page is executed by applying such reduction rate not only to the objects but also to the characters.

In the following there will be explained a specific example of the result of formatting process in the fifth embodiment. By applying the formatting process of the second embodiment on the HTML input document data of the foregoing fourth embodiment shown in FIG. 27, there can be obtained a conversion result as shown in FIG. 30. The result of actual printing of the document data shown in FIG. 30 is shown in FIG. 31. As shown in FIGS. 30 and 31, a table constituting an object of the maximum width is appropriately allotted in the page and the character size is made smaller than in the fourth embodiment shown in FIG. 28.

As explained in the foregoing, the fifth embodiment enables, at the formatting of the structured description language, appropriate allotment in the page by physical layout based on the maximum object width.

Sixth Embodiment

In the following there will be explained a sixth embodiment of the preseent invention.

The third embodiment is featured by a fact that the most frequent font size, which is the character size having the highest frequency of use, is used for setting the base value of the physical layout constituting the font size information that can be set in advance or in interactive manner.

Figure 26:
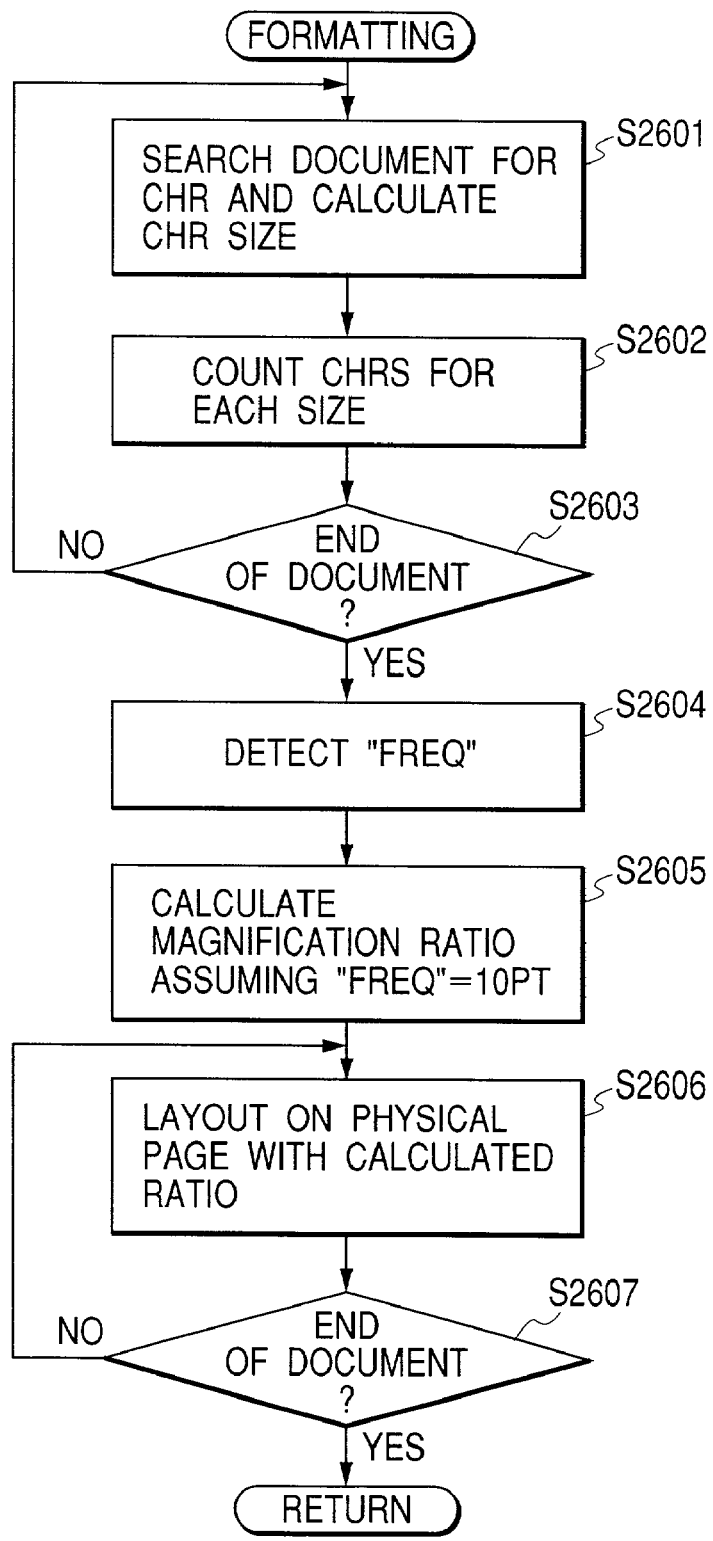
FIG. 26 is a flow chart showing a formatting process in a sixth embodiment.

FIG. 26 is a flow chart showing the formatting process in the sixth embodiment. The system configuration of the sixth embodiment, and the main sequence and drawing process in the printing operation thereof are similar to those in the aforementioned fourth embodiment and will not, therefore, be explained further.

At first a step S2601 searches the document data from the start, and calculates the character size upon detecting character data, and a step S2602 counts and stores the number of characters for each character size. Then a step S2603 discriminates whether the search has been completed for all the document data, and the process of the steps S2601 to S2602 is repeated until the search is completed, thereby completing a list of the character sizes and the number of characters used in the document.

In case the step S2603 identifies that all the document data have been searched, the sequence proceeds to a step S2604 to detect the most frequent character size freq having the largest number of characters, from the stored list of the sizes. Then a step S2605 calculates the magnification rate in case the recognized most frequent character size freq is regarded as 10 points. The magnification rate thus determined is used as the base for the physical layout, and a step S2606 executes the allotment to the physical pages in succession from the start of the document, utilizing such magnification rate.

Then a step S2607 discriminates whether the allotment to the physical pages has been completed for all the document data, and the allotment process of the step S2606 is repeated until the process is completed.

In the following there will be shown a specific example of the formatting process shown in FIG. 26. For example, if the steps S2601 to S2603 list 10 characters of 8 points, 400 characters of 10 points and 8 characters of 20 points as the character sizes used in the document, the step S2604 detects 10 points as the most frequent character size freq. Then the step S2605 calculates the magnification rate as 10/10 (=1) for obtaining the characters of 10 points. Therefore, other listed character sizes of 8 and 20 points are allotted also to the physical pages. The allotment to the physical page is executed by applying such magnification rate (1 in the above-described example) not only to the figures (objects) but also to the characters.

In the following there will be explained a specific example of the result of formatting process in the sixth embodiment. By applying the formatting process of the sixth embodiment on the HTML input document data of the foregoing fourth embodiment shown in FIG. 27, there can be obtained a conversion result as shown in FIG. 31. The result of actual printing of the document data shown in FIG. 30 is shown in FIG. 33.

In this example, since the base font size for the most frequent character size ("This document . . . web browser.") shown in FIG. 27 is set at 6 points as explained in the foregoing, the magnification rate is calculated as 10/6. Thus, since the title characters ("Sample") in FIG. 27 has a size of 14 points while the smallest characters ("table 1") has a size of 4 points, the conversion in FIG. 31 is executed in such a manner that the most frequent character size becomes 10 points, the title characters have a size of 14×10/6=23.33 (23) points and the smallest characters have a size of 4×10/6=6.66 (7) points. This magnification rate (10/6) is applied also to the table object of the largest width whereby the table is barely allotted in the page as shown in FIG. 33.

As explained in the foregoing, the sixth embodiment enables appropriate allotment within the page by executing physical layout based on the most frequent character size at the formatting of the structured description language.

Also the calculation of the magnification rate in the present embodiment is not limited, as in the first embodiment, to the case of enlarging the detected most frequent character size to 10 points but is likewise applicable to the enlargement to other sizes. Also the conversion of the character size may be executed not only by the multiplication of the magnification rate but also by an optimizing process such as rounding to a suitable number of points.

Seventh Embodiment

In the foregoing embodiment, the magnification rate is calculated for the entire page by recognizing the character size or the maximum width of the object. In the present embodiment, there will be explained, with reference to FIGS. 34 to 39, an example of employing different magnification rates respectively for the character and the object.

Figure 34:
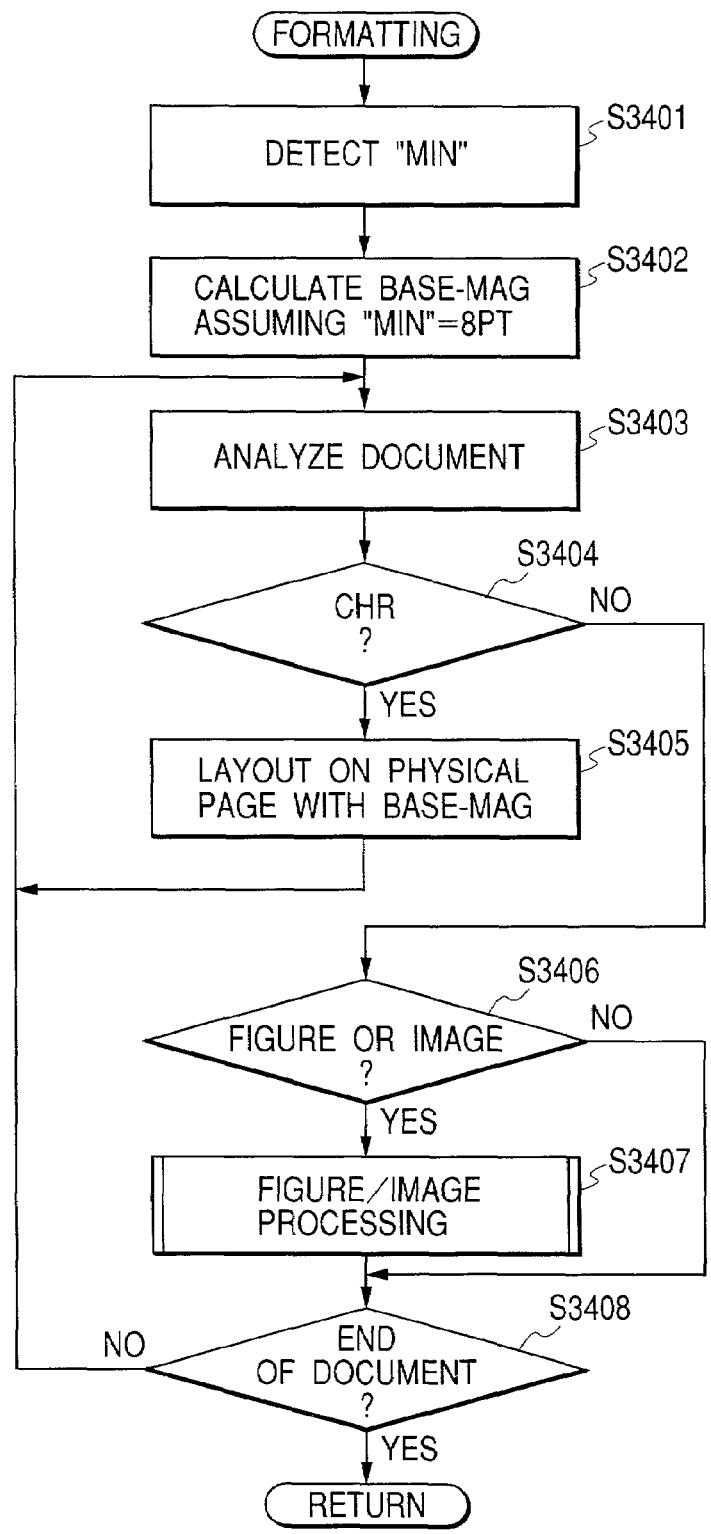
FIG. 34 is a flow chart showing a formatting process in a seventh embodiment.

In FIG. 34, there are shown process steps S3401 to S3408. In the present embodiment, the main process from the start of the operation of the printing apparatus to the end thereof and the drawing process therein are similar to those in the foregoing embodiments and will not, therefore, be explained further, and there will only be explained the difference between the present embodiment and the foregoing embodiments. In the present embodiment, there will be explained a case of recognizing the minimum character size and calculating the magnification rate thereon as explained for example in the fourth embodiment (shown in FIG. 24), but the magnification rate may also be calculated from the character size by recognizing the size of the most frequent character as shown in FIG. 26. In the following there will be explained the difference from the foregoing embodiments.

FIG. 34 shows the formatting process employed in FIG. 24 and constituting a layout process to the physical page.

At first, a step S3401 searches the document data from the start and calculates the character size upon detection of character data. Then a step S3402 calculates a magnification rate (hereinafter called base magnification rate, base-mag) in case the detected character size is regarded as 8 points. The base magnification rate is basically applied to all the drawing process for character, figure and image, and for example becomes 8/6 in case the maximum character size detected in the step S3401 is 6 points. It is explained "basically" applicable since it is changed to a specified magnification rate in case of figure/image processing, which will be explained later. After the calculation of the base magnification rate, a step S3403 analyzes the content of the document description from the start of the document. If the analyzed description indicates character drawing (step S3404), the sequence proceeds to a step S3405 for executing the layout to the physical page after multiplying the character size and the character pitch with thebase magnification rate. On the other hand, if the step S3404 identifies that the analyzed description does not indicate the character drawing, the sequence proceeds to a step S3406 for discriminating whether it indicates figure/image drawing. In case of figure/image drawing, the sequence proceeds to a step S3407 for executing a figure/image process. The process of the steps S3403 to S3407 is repeated until the analysis of all the document and the allotment thereof to the physical pages are completed (step S108).

Figure 35:
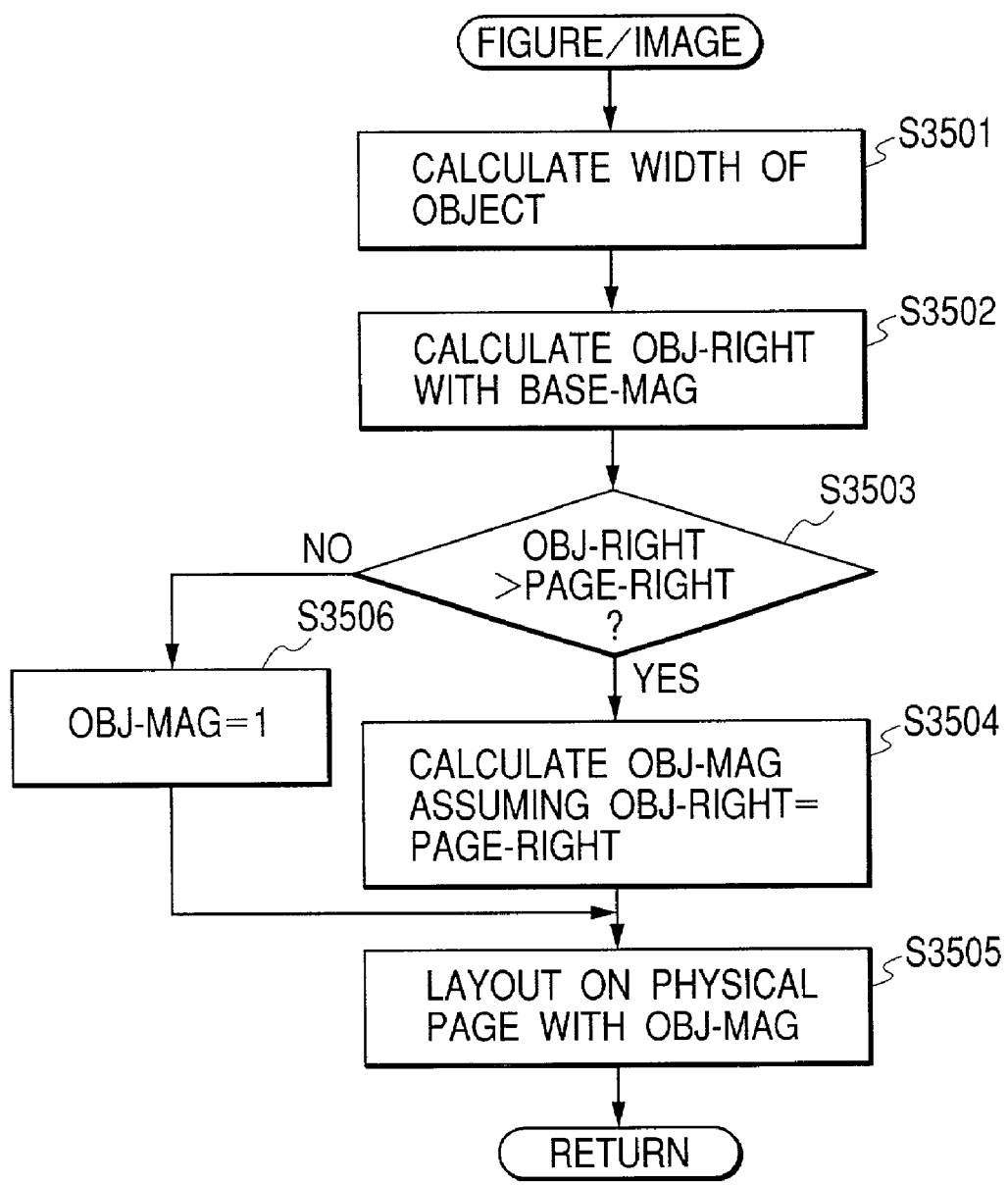
FIG. 35 is a flow chart showing a figure/image processing shown in FIG. 34.

FIG. 35 shows a figure/image process corresponding to the step S3407 in FIG. 34. This process is to allot a figure or an image to the physical page. In the following, the figure and image are collectively called an object.

At first a step S3501 calculates the width of an object. The width of the object can be calculated, in case of a table, from the width information designated in the table or from the size of the character described in the table, and, in case of an image, from the image information described in the header of the data format. Then a step S3502 calculates the right-hand end of the object (obj-right) by multiplication of the base magnification rate calculated in the step S3402 shown in FIG. 34. More specifically, the right-hand end of the object can be determined by multiplying the sum of the drawing start position of the object and the width of the object with the base magnification rate. Then a step S3503 discriminates whether the right-hand end of the object is larger than the right-hand end of the page (page-right), namely whether the object overflows from the right-hand end of the page. If the object overflows from the right-hand end of the page, the sequence proceeds to a step S3504 for calculating the magnification rate (obj-mag) when the right-hand end of the object is set at the right-hand end of the page. More specifically, the obj-mag can be obtained by dividing the difference between the right-hand end of the page and the drawing start position of the object by the width of the object. On the other hand, if the step S3502 identifies that the object does not overflow from the right-hand end of the page, a value 1 is set in the obj-mag. Finally, a step S3505 executes allotment to the physical page by scaling the object with the obj-mag. Thus, in case the figure or image overflows from the sheet with the magnification rate calculated from the character size, the magnification rate is individually changed only for the figure and the image, thereby placing such figure and the image forcedly within a page and avoiding output with the figure or image in a broken form. In this manner there can be attained pleasant page layout.

Figure 37:
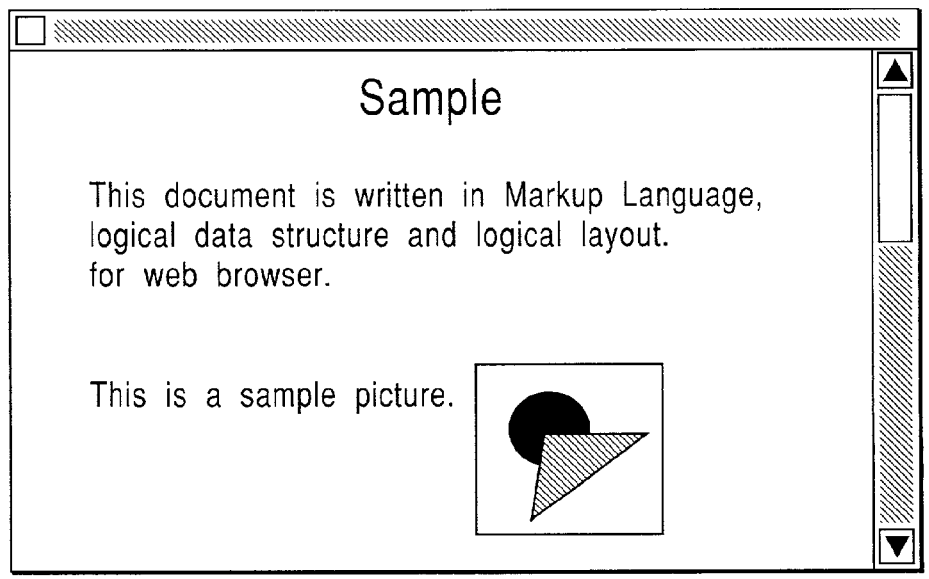
FIG. 37 is a view showing a document displayed by web browser.
Figure 38:
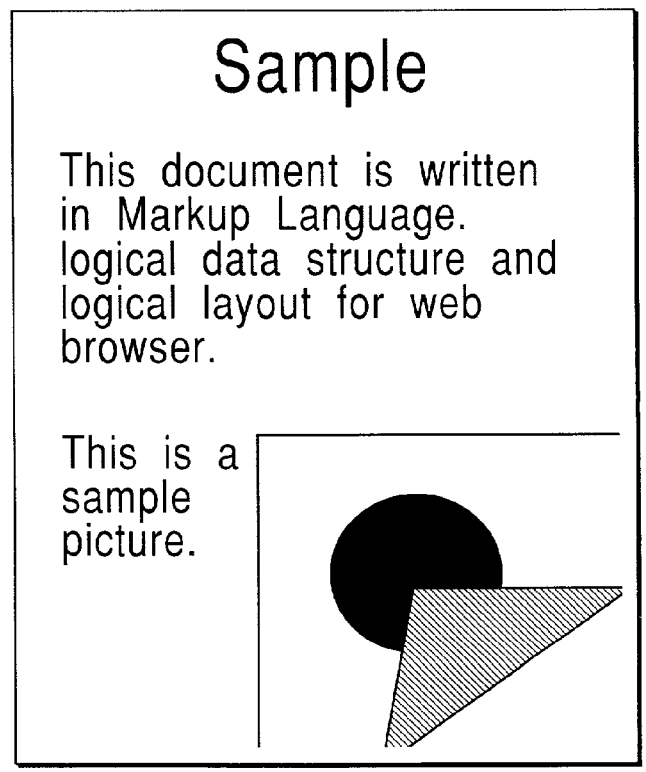
FIG. 38 is a view showing an example of print result by applying a magnification rate taking character only into consideration.
Figures 39, 40:
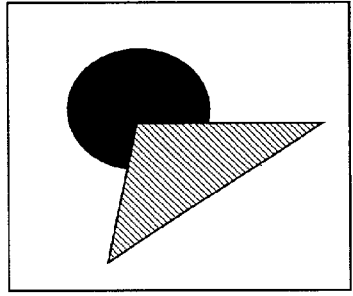
FIG. 39 is a view showing an example of print result in the eighth embodiment.
FIG. 40 is a view showing an example of reference print instruction in the eighth embodiment.

Specific examples of the present embodiment are shown in FIGS. 37, 38 and 39.

FIG. 37 shows a document displayed by the web browser, and FIG. 38 shows the result of printing of the document shown in FIG. 37 by the printing apparatus. In the document shown in FIG. 37, the image data are pasted among the character trains. FIG. 38 shows an example of the print obtained by applying a magnification rate determined in consideration of the character only. In the method of applying the magnification rate to all the objects as in the fourth, fifth or sixth embodiment, there may result an overflow from the page as shown in FIG. 38. On the other hand, the layout process of the present embodiment allows to accommodate the image data within the page even when the characters are enlarged as shown in FIG. 39, thereby providing a pleasant-looking output.

Eighth Embodiment

In contrast to the seventh embodiment in which the magnification rate for the object is calculated only in case of overflowing from the page, the present embodiment designates in advance bases respectively to the character and the object thereby enabling external control of the magnification rate, as will be explained in the following with reference to FIG. 36. In the following there will be explained the difference from the foregoing embodiment.

Figure 36:
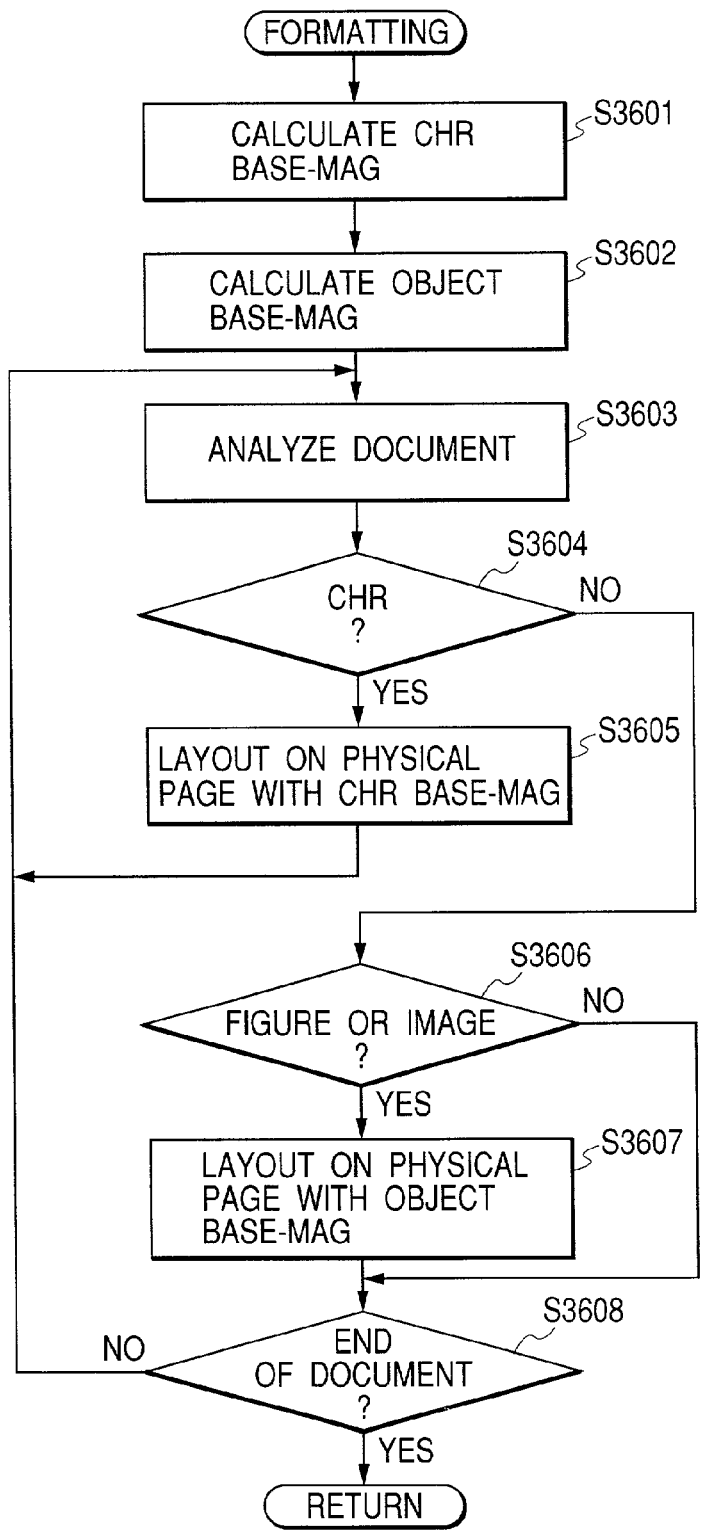
FIG. 36 is a flow chart showing a formatting process in an eighth embodiment.

In FIG. 36, there are shown process steps S3601 to S3608. In the present embodiment, the main process from the start of the operation of the printing apparatus to the end thereof and the drawing process therein are similar to those in the foregoing embodiments and will not, therefore, be explained further.

FIG. 40 shows an example of the reference print instruction in the present embodiment. The items contained therein are already explained in the foregoing embodiments, but the example shown in FIG. 40 designates an object magnification rate <object-mag> in addition to the standard font size. The <object-mag> small means that a "smaller" magnification rate is designated for the object.

FIG. 36 shows a formatting process shown in FIG. 24 and corresponding to a layout process to the physical page. At first a step S3601 calculates the character base magnification rate (CHR-base-mag). The calculation method therefor is same as explained in the foregoing embodiment and will not, therefore, be explained further. In case of the designation shown in FIG. 7, the object base magnification rate (object base-mag) is calculated by multiplying the character base magnification rate with 3/4. The value 3/4 is retained in advance for "small", and other values are also retained one-to-one to specified character trains, for example "middle"=1 and "big"=4/3. After the calculation of the character base magnification rate and the object base magnification rate, a step S3603 analyzes the content of the document description from the start of the document. If the analyzed description indicates character drawing (step S3604), the sequence proceeds to a step S3605 for executing the layout to the physical page after multiplying the character size and the character pitch with the base magnification rate. On the other hand, if the step S3604 identifies that the analyzed description does not indicate the character drawing, the sequence proceeds to a step S3606 for discriminating whether it indicates figure/image drawing. In case of figure/image drawing, the sequence proceeds to a step S3607 for executing allotment to the physical page by multiplying the drawing position, width and height with the object base magnification rate. The process of the steps S3603 to S3607 is repeated until the analysis of all the document and the allotment thereof to the physical pages are completed (step S3608).

Figure 41:
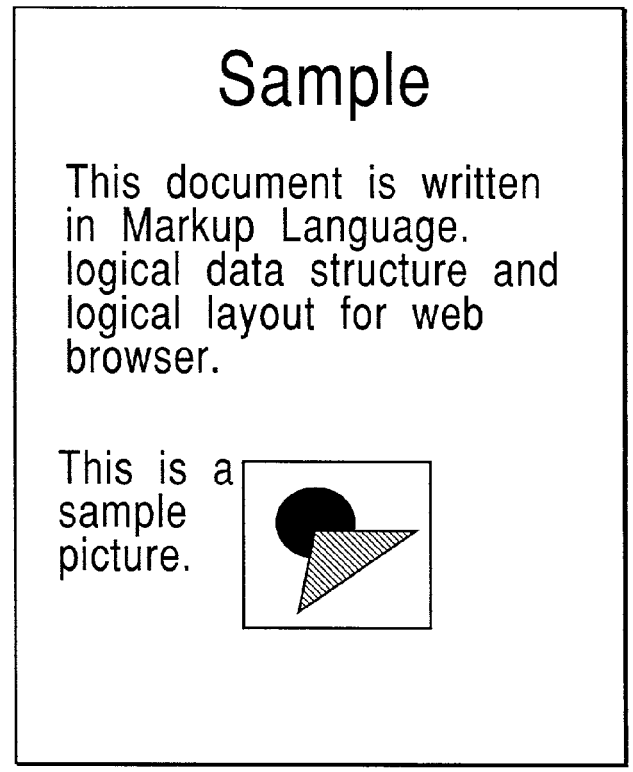
FIG. 41 is a view showing an example of print result in the eighth embodiment.

A specific example of the present embodiment is shown in FIG. 41.

FIG. 41 shows the result of printing in the present embodiment of the document shown in FIG. 37, wherein the characters are magnified by 8/6 times in the layout, while the magnification of the image is (8/6)×(3/4)=1.

Ninth Embodiment

In the following there will be explained a ninth embodiment of the present invention.

The ninth embodiment is featured in that there is arbitrarily selectable any of the formatting processes shown in the foregoing fourth to eighth embodiments or a part thereof. More specifically, the system configuration, and the main process and drawing process in the printing operation in the fifth embodiment are similar to those in the fourth embodiment, but the base value for physical layout in the formatting process can be selected according to any of the minimum character size, the maximum object width or the most frequent character size.

More specifically, the user is rendered capable of selecting, on the operation panel 1012 of the printer 1000, one of the above-mentioned three methods as the reference value for formatting, namely one of the layout methods respectively corresponding to the fourth to sixth embodiments. FIG. 42 shows an example of such embodiment. FIG. 42 shows a part of the image to be displayed on the operation panel 1012 and constituting a font size designation unit 4200 for designating the font size. This image may also be displayed on the CRT of the host computer connected to the printer through the network. It is also possible to designate the font size with a mouse or a keyboard, on the CRT of the host computer and to enter thus designated font size to the font size input unit of the printer.

An OK button 4201 is depressed upon completion of the designation of the font size, thereby rendering such designation effective. A cancel button 4202 cancels the designation of the font size. Selection means 4203, 4204, 4209 are used for selecting a character or a character train to be subjected to the font size designation. A font size designating field 4205 for entering the font size selected by the selection means 4203, 4204 (the smallest font size being selected in the illustrated example). In this manner there is selected the font size information contained in the structured document for determining the font magnification. Upon selection of 4209, the output is made with the font size designated by 4205, regardless of the applied font size information. Buttons 4206, 4207, 4208 are used for changing the base font. For example a button 4206, shown as "big" changes the font size of the defined style sheet to a large size. Thus the character train, to which applied is the style sheet defining the base font size, is outputted with a relatively large predetermined base font size. However, there is not influenced a portion which is excluded from the application of the base font size defined by the style sheet and to which the font size is designated individually. On the other hand, the minimum font size is designated as 12 points in the font size designating field, and the output is made with the minimum font size at 12 points or larger regardless of the style sheet. In this manner there can be obtained an image securely legible to the aged persons regardless whether the style sheet is applied or not in the structured document.

The operability can be improved further by a configuration in which the result of formatting based on the selected base value can be previewed in the unit of a page on the CRT 10 connected to the host computer.

As explained in the foregoing, the ninth embodiment enables formatting desired by the user. For example, it is possible, for the same document data described by HTML, to select the output form as shown in FIGS. 28, 32 or 33.

In the foregoing there have been explained examples of calculating the character size by the number of points, but the present invention is applicable also to a document in which the character size is represented by other representations (for example big/middle/small), by retaining the ratios of such sizes (big/middle/small) in advance.

Also in the foregoing embodiments, the document data to be subjected to formatting are assumed to be described by HTML, but the present invention is not limited to such case and is naturally applicable to other structured description languages such as XML or SCGML.

The present invention is applicable to a system consisting of plural equipment (for example host computer, interface device, reader, printer etc.) or an apparatus consisting of a single equipment (for example copying apparatus, facsimile etc.).

The objects of the present invention can naturally be attained also by supplying a system or an apparatus with a memory medium (or recording medium) storing program codes of a software realizing the functions of the aforementioned embodiments and by reading and executing the program codes stored in the memory medium by a computer (or CPU or MPU) of such system or apparatus. In such case, the program codes themselves read from the memory medium realize the functions of the aforementioned embodiments and the memory medium storing the program codes constitutes the present invention. The present invention further includes not only a case where the functions of the aforementioned embodiments are realized by the execution of the read program codes by the computer but also a case where an operating system or the like functioning on the computer executes all the processes or a part thereof under the instruction of the program codes, thereby realizing the functions of the aforementioned embodiments.

In such case, the program codes themselves read from the memory medium realize the functions of the aforementioned embodiments and the memory medium storing the program codes constitutes the present invention. The memory medium for supplying the program codes can be, for example, a floppy disk, a hard disk, an optical disk, a magnetooptical disk, a CD-ROM, a CD-R, a magnetic tape, a non-volatile memory card, a ROM or an EEPROM.

The present invention further includes not only a case where the functions of the aforementioned embodiments are realized by the execution of the read program codes by the computer but also a case where an operating system or the like functioning on the computer executes all the processes or a part thereof under the instruction of the program codes, thereby realizing the functions of the aforementioned embodiments.

The present invention further includes a case where the program codes read from the memory medium are once stored in a memory provided in a function expansion board inserted into the computer or a function expansion unit connected thereto and a CPU or the provided on the function expansion board or the function expansion unit executes all the processes or a part thereof under the instruction of the program codes, thereby realizing the functions of the aforementioned embodiments.

The functions of the embodiments shown in FIGS. 9 to 13, 17 and 20 may be realized by the host computer by an externally installed program. The present invention is applicable also in a case where a group of information including a program is supplied by a memory medium such as a CD-ROM, a flush memory or an FD or by an external memory medium through a network.

What is claimed is:

1. A printing apparatus comprising:
storage means for storing document data received via a network and described in a predetermined structured description language;
analysis means for analyzing the document data stored by said storage means and recognizing font sizes contained in the document data, and for recognizing characters contained in the document data to which the font sizes are applied;
display means for displaying a first font size to be selected from among a group consisting of (i) a smallest size, (ii) a most frequently used size and (iii) all sizes on an operation panel of said printing apparatus;
instruction input means for selecting the first font size from among the smallest size, the most frequently used size and the all sizes displayed on the operation panel by said display means, and entering a second font size to be used for formatting the document data for printing on at least one print page, the second font size being different from the first font size;
discrimination means for discriminating whether the first font size selected by said instruction input means indicates the smallest size, the most frequently used size or the all sizes;
scaling means for scaling all the characters contained in the document data (a) such that a smallest font size in the document data becomes equal to the second font size entered by said instruction input means, if said discrimination means discriminates that the first font size indicates the smallest size, (b) such that a most frequently used font size in the document data becomes equal to the entered second font size, if said discrimination means discriminates that the first font size indicates the most frequently used size, and (c) such that all font sizes in the document become equal to the entered second font size, if said discrimination means discriminates that the first font size indicates the all sizes;
image forming means for executing an image forming process such that data representing the character recognized by said analysis means is outputted for printing on the at least one print page on which contents of the document data are laid out in accordance with the scaling by said scaling means; and
printing means for printing data based on print data formed in the image forming process executed by said image forming means,
wherein the document data does not include a concept of page.

2. An apparatus according to claim 1, wherein:
said analysis means calculates a magnification change rate utilizing the font size contained in the document data, and information relating to the second font size entered by said instruction input means; and
said image forming means executes the image forming process by changing the magnification of the character by the magnification change rate so as to output for printing on the at least one print page data representing the character at the second font size.

3. An apparatus according to claim 1, wherein:
the document data include information for designating the first font size for a specified character recognizable by said analysis means; and
said image forming means executes the image forming process such that data representing the specified character for which the first font size is designated, is outputted for printing on the at least one print page at the second font size entered by said instruction input means regardless of the information designating the first font size.

4. An apparatus according to claim 1, wherein:
the second font size is designatable by the document data;
said analysis means calculates a magnification change rate utilizing a base font size and the second font size entered by said instruction input means; and
said image forming means executes the image forming process by applying the magnification change rate to the entire character information contained in the document data in such a manner that data representing a character, to which the base font size is applied, is outputted for printing on the at least one print page at the second font size entered by said instruction input means.

5. An apparatus according to claim 1, wherein:
said analysis means recognizes the most frequent font size occurring in the document data; and
said image forming means executes the image forming process such that data representing a character, to which the most frequent font size recognized by said analysis means is applied, is outputted for printing on the at least one print page at the second font size entered by said instruction input means.

6. An apparatus according to claim 1, wherein:
said analysis means recognizes a minimum font size in the document data; and
said image forming means executes the image forming process such that data representing character information formatted for printing on the at least one print page is outputted for printing on the at least one print page a font size at least equal to the second font size entered by said instruction input means when said analysis means recognizes the minimum font size.

7. An apparatus according to claim 1, wherein:
the document data includes at least object data representing an image or a table and the character;
said analysis means detects the size of an image represented by the object data; and
said image forming means executes an image forming process such that data representing the image or the table formatted to fit and be printed on the at least one print page is outputted after said analysis means detects the size of the image and that data representing the character contained in the document data is outputting for printing on the at least one print page at the second font size entered by said instruction input means.

8. An apparatus according to claim 1, wherein:
the document data includes at least object data representing an image or a table and the character;
said analysis means detects the size of the image represented by the object data; and
said image forming means executes the image forming process such that the image, when printed on the at least one print page, is subjected to a magnification change according to the width of the least one print page on which the image is to be printed and that data representing the character contained in the document data is outputted for printing on the at least one print page at the second font size entered by said instruction input means.

9. An apparatus according to claim 1, wherein said apparatus communicates with an arbitrary server apparatus for receiving and processing the document data.

10. An apparatus according to claim 1, further comprising selection means for selecting a method of formatting the document data to be printed on the at least one print page according to an instruction of the user, wherein a method for calculating a magnification change rate changing the magnification of the character is determined according to the result of the selection by said selection means.

11. An apparatus according to claim 1, further comprising a printing unit configured to print the document in accordance with the image forming process executed by said image forming means.

12. An apparatus according to claim 1, wherein said apparatus is a printer.

13. A printing method comprising:
a storage step of storing document data received via a network and described in a predetermined structured description language;
an analysis step of analyzing the document data stored in said storage step and recognizing font sizes contained in the document data, and for recognizing characters in the document data to which the font sizes are applied;
a display step of displaying a first font size to be selected from among a group consisting of (i) a smallest size. (ii) a most frequently used size and (iii) all sizes on an operation panel of a printing apparatus;
an instruction input step of selecting the first font size from among the smallest size, the most frequently used size and the all sizes displayed on the operation panel in said display step, and entering a second font size to be used for formatting the document data for printing on at least one print page, the second font size being different from the first font size;
a discrimination step of discriminating whether the first font size selected in said instruction input step indicates the smallest size, the most frequently used size or the all sizes;
a scaling step of scaling all the characters contained in the document data (a) such that a smallest font size in the document data becomes equal to the second font size entered in said instruction input step, if said discrimination step discriminates that the first font size indicates the smallest size, (b) such that a most frequently used font size in the document data becomes equal to the entered second font size, if said discrimination step discriminates that the first font size indicates the most frequently used size, and (c) such that all font sizes in the document become equal to the entered second font size, if said discrimination step discriminates that the first font size indicates the all sizes;
an image forming step of executing an image forming process such that data representing the character recognized by said analysis step is outputted for printing on the at least one print page on which contents of the document data are laid out in accordance with the scaling by said scaling step; and
a printing step of printing data based on print data formed in the image forming process executed in said image forming step,
wherein the document data does not include a concept of page.

14. A method according to claim 13, wherein:
said analysis step calculates a magnification change rate utilizing the first font size indicated by specified character information contained in the document data, and information relating to the second font size entered by said instruction input step; and
said image forming step executes an image forming process such that data representing a character is outputted for printing on the at least one physical sheet at a font size changed by the magnification change rate calculated in said analysis step.

15. A method according to claim 13, wherein:
the document data include information for designating the first font size for a specified character recognized by said analysis step; and
said image forming step executes the image forming process such that data representing the character for which the first font size is designated, is outputted for printing on the at least one print page at the second font size entered by said instruction input step regardless of the information designating the first font size.

16. A method according to claim 13, wherein:

the second font size is designatable by the document data;

said analysis step calculates a magnification change rate utilizing a base font size and the second font size entered by said instruction input step; and said image forming step is executed by applying the magnification change rate to the entire character information contained in the document data such that data representing a character, to which the base font size is applied, is outputted for printing on the at least one print page at the second font size entered by said instruction input step.

17. A method according to claim 13, wherein:

said analysis step recognizes a minimum font size in the document data; and said image forming step executes the image forming process such that data representing character information formatted for printing on the at least one print page is outputted for printing on the at least one print page at a font size at least equal to the second font size entered by said instruction input step when said analysis step recognizes the minimum font size.

18. A method according to claim 13, wherein:

the document data includes at least object data representing an image or a table and the character;

said analysis step detects the size of the image represented by the object data; and said image forming step executes the image forming process such that data representing the image or the table formatted to fit and be printed on the least one print page is outputted after said analysis step detects the size of the image, and that data representing the character contained in the document data is outputted for printing on the at least one print page at the second font size entered by said instruction input step.

19. A method according to claim 13, wherein:

the document data includes at least object data representing an image or a table and the character;

said analysis step detects the size of an image represented by the object data; and said image forming step executes an image forming process such that the image, when printed on the at least one print page, is subjected to a magnification change according to the width of the at least one print page on which the image is to be printed and that data representing the character contained in the document data is outputted for printing on the at least one print page at the second font size entered by said instruction input step.

20. A method according to claim 19, further comprising a format process step for scaling each character in the document to a base character size when data representing the document is outputted for printing on the at least one print page in said image forming step, based on a font size designated in print set information and the second font size inputted by said instruction input step.

21. A method according to claim 13, further comprising an acquisition step of communicating with an arbitrary server apparatus for receiving and processing the document data.

22. A method according to claim 13, further comprising a selection step of selecting a method of formatting the document data to be printed on the print page according to an instruction of the user, wherein a calculation method for calculating a magnification change rate changing the magnification of the character is determined according to the result of the selection by said selection step.

23. A method according to claim 13, further comprising a printing step of printing the document in accordance with the image forming process executed in said image forming step.

24. A method according to claim 13, wherein said method is used in a printer.

25. A computer readable memory medium storing a program for causing a computer to execute a printing method, comprising:

a storage step of storing document data received via a network and described in a predetermined structured description language;

an analysis step of analyzing the document data stored in said storage step and recognizing font sizes contained in the document data, and recognizing characters contained in the document data to which the font sizes are applied;

a display step of displaying a first font size to be selected from among a group consisting of (i) a smallest size, (ii) a most frequently used size and (iii) all sizes on an operation panel of a printing apparatus;

an instruction input step of selecting the first font size from among the smallest size, the most frequently used size and the all sizes displayed on the operation panel in said display step, and entering a second font size to be used for formatting the document data for printing on at least one print page, the second font size being different from the first font size;

a discrimination step of discriminating whether the first font size selected in said instruction input step indicates the smallest size, the most frequently used size or the all sizes;

a scaling step of scaling all the characters contained in the document data (a) such that a smallest font size in the document data becomes equal to the second font size entered in said instruction input step, if said discrimination step discriminates that the first font size indicates the smallest size, (b) such that a most frequently used font size in the document data becomes equal to the entered second font size, if said discrimination step discriminates that the first font size indicates the most frequently used size, and (c) such that all font sizes in the document become equal to the entered second font size, if said discrimination step discriminates that the first font size indicates the all sizes;

an image forming step of executing an image forming process such that data representing the character recognized by said analysis step is outputted for printing on the at least one print page on which contents of the document data are laid out in accordance with the scaling in said scaling step; and a printing step of printing data based on print data formed in the image forming process executed in said image forming step, wherein the document data does not include a concept of page.

* * * * *

UNITED STATES PATENT AND TRADEMARK OFFICE
CERTIFICATE OF CORRECTION

PATENT NO.        : 7,386,790 B2
APPLICATION NO.   : 09/950020
DATED             : June 10, 2008
INVENTOR(S)       : Yasuhiro Hino It is certified that error appears in the above-identified patent and that said Letters Patent is hereby corrected as shown below:

COLUMN 1:

Line 18, "fields." should read --field.--; and
    Line 27, "(extensible" should read --(eXtensible--.

COLUMN 2:

Line 20, "thestate" should read --the state--.

COLUMN 3:

Line 22, "desintate" should read --designate--;
    Line 23, "throughoutthereof." should read --throughout.--;
    Line 40, "theimage" should read --the image--; and
    Line 48, "of of" should read --of--.

COLUMN 5:

Line 50, "tusby" should read --tus by--; and
    Line 63, "following" should read --the following--.

COLUMN 7:

Line 4, "plural unit" should read --plural units--;
    Line 14, "FIG 2," should read --FIG. 3,--;
    Line 32, "thereference" should read --the reference--; and
    Line 64, "page memory 11005" should read --page memory 1105--.

COLUMN 8:

Line 13, "mannere" should read --manner--;
    Line 30, "details" should read --detail--; and
    Line 46, "designated" should read --designates--.

COLUMN 10:

Line 41, "theprocess" should read --the process--;
    Line 55, "received" should read --received data--; and
    Line 60, "ifnot," should read --if not,--.

COLUMN 13:

Line 6, "smanually" should read --manually--;
    Line 18, "size the" should read --size of the--;
    Line 40, "it" should read --if--;
    Line 55, "outputprocess" should read --output process--; and
    Lines 64-67, close up left margin.

COLUMN 15:

Line 51, "simplied" should read --simplified--;
    Line 56, "thereference" should read --the reference--; and
    Line 59, "outputof" should read --output of--.

COLUMN 16:

Line 12, "tothe" should read --to the--; and
    Line 13, "thedata" should read --the data--.

COLUMN 17:

Line 30, "desigsnated" should read --designated--.

COLUMN 18:

Line 64, "suchas" should read --such as--.

COLUMN 19:

Line 34, "thereduction rate" should read --the reduction rate,--; and
    Line 35, "is," should be deleted.

COLUMN 21:

Line 64, "thebase" should read --the base--.

COLUMN 22:

Line 6, "(step S108)." should read --(step S3408).--; and
    Line 54, "embodiment," should read --embodiments,--.

COLUMN 25:

Line 39, "the provided" should read --the memory provided--.

CERTIFICATE OF CORRECTION (continued)
U.S. Pat. No. 7,386,790 B2

COLUMN 27:

Line 30, "outputting" should read --outputted--.

COLUMN 29:

Line 30, "least" should read --at least--.

Signed and Sealed this

Twenty-sixth Day of January, 2010

David J. Kappos
*Director of the United States Patent and Trademark Office*